United States Patent
Jones et al.

(10) Patent No.: US 12,544,698 B2
(45) Date of Patent: Feb. 10, 2026

(54) FILTRATION MEDIA

(71) Applicant: Donaldson Company, Inc., Bloomington, MN (US)

(72) Inventors: Derek O. Jones, Andover, MN (US); Klenton T. Willis, Woodbury, MN (US)

(73) Assignee: Donaldson Company, Inc., Bloomington, MN (US)

( * ) Notice: Subject to any disclaimer, the term of this patent is extended or adjusted under 35 U.S.C. 154(b) by 37 days.

(21) Appl. No.: 17/776,956

(22) PCT Filed: Apr. 2, 2021

(86) PCT No.: PCT/US2021/025673
§ 371 (c)(1),
(2) Date: May 13, 2022

(87) PCT Pub. No.: WO2021/203066
PCT Pub. Date: Oct. 7, 2021

(65) Prior Publication Data
US 2023/0018302 A1 Jan. 19, 2023

Related U.S. Application Data

(60) Provisional application No. 63/004,926, filed on Apr. 3, 2020, provisional application No. 63/081,143, filed on Sep. 21, 2020.

(51) Int. Cl.
*B01D 39/16* (2006.01)
*B01D 37/00* (2006.01)
(Continued)

(52) U.S. Cl.
CPC ........... *B01D 39/163* (2013.01); *B01D 37/00* (2013.01); *B01D 39/18* (2013.01);
(Continued)

(58) Field of Classification Search
None
See application file for complete search history.

(56) References Cited

U.S. PATENT DOCUMENTS

| | | |
|---|---|---|
| 5,554,287 A | 9/1996 | Beck et al. |
| 6,165,572 A | 12/2000 | Kahlbaugh et al. |
| (Continued) | | |

FOREIGN PATENT DOCUMENTS

| | | |
|---|---|---|
| CN | 101182652 A | 5/2008 |
| CN | 101952210 A | 1/2011 |
| (Continued) | | |

OTHER PUBLICATIONS

Zhao et al., "Electrospun Bead-on-String Fibers: Useless or Something of Value? Chapter 5," in Novel Aspects of Nanofibers, 2018, pp. 87-102.

(Continued)

*Primary Examiner* — Allison G Fitzsimmons
(74) *Attorney, Agent, or Firm* — Mueting Raasch Group

(57) ABSTRACT

This disclosure describes a filtration medium that is preferably glass-free or substantially glass-free. In some embodiments, the filtration medium preferably exhibits capacity and efficiency comparable to or better than similar glass-containing filtration media. The filtration medium includes bicomponent fibers, efficiency fibers (for example, PET fibers), and microfibrillated fibers. The efficiency fibers include fibers having a fiber diameter in a range of 1 micron to 5 microns and fibers having a fiber diameter of at least 0.1 micron and less than 1 micron.

18 Claims, 8 Drawing Sheets

(51) Int. Cl.
  *B01D 39/18* (2006.01)
  *B32B 5/26* (2006.01)
(52) U.S. Cl.
  CPC .............. *B01D 2239/0216* (2013.01); *B01D 2239/0618* (2013.01); *B01D 2239/1216* (2013.01); *B01D 2239/1233* (2013.01); *B01D 2239/1258* (2013.01); *B01D 2239/1266* (2013.01); *B01D 2239/1291* (2013.01)

(56) References Cited

U.S. PATENT DOCUMENTS

| | | | |
|---|---|---|---|
| 6,673,136 B2 | 1/2004 | Gillingham et al. | |
| 6,716,274 B2 | 4/2004 | Gogins et al. | |
| 6,743,273 B2 | 6/2004 | Chung et al. | |
| 6,746,517 B2 | 6/2004 | Benson et al. | |
| 6,800,117 B2 | 10/2004 | Barris et al. | |
| 6,875,256 B2 | 4/2005 | Gillingham et al. | |
| 6,924,028 B2 | 8/2005 | Chung et al. | |
| 6,955,775 B2 | 10/2005 | Chung et al. | |
| 7,070,640 B2 | 7/2006 | Chung et al. | |
| 7,090,715 B2 | 8/2006 | Chung et al. | |
| 7,160,451 B2 | 1/2007 | Hacker et al. | |
| 7,238,285 B2 | 7/2007 | Hacker et al. | |
| 7,309,372 B2 | 12/2007 | Kahlbaugh et al. | |
| 7,314,497 B2 | 1/2008 | Kahlbaugh et al. | |
| 7,316,723 B2 | 1/2008 | Chung et al. | |
| 7,318,852 B2 | 1/2008 | Chung et al. | |
| 7,641,055 B2 | 1/2010 | Ferrer et al. | |
| 7,981,336 B2 | 7/2011 | Pourdeyhimi | |
| 7,985,275 B2 | 7/2011 | Smithies | |
| 7,988,860 B2 | 8/2011 | Kalayci et al. | |
| 8,057,567 B2 | 11/2011 | Webb et al. | |
| 8,262,780 B2 | 9/2012 | Smithies et al. | |
| 8,263,214 B2 | 9/2012 | Kalayci et al. | |
| 8,267,681 B2 | 9/2012 | Gupta et al. | |
| 8,268,033 B2 | 9/2012 | Rogers et al. | |
| 8,277,529 B2 | 10/2012 | Rogers et al. | |
| 8,366,797 B2 | 2/2013 | Chung et al. | |
| 8,512,435 B2 | 8/2013 | Rogers et al. | |
| 8,513,431 B2 | 8/2013 | Annis et al. | |
| 8,524,041 B2 | 9/2013 | Gupta et al. | |
| 8,641,796 B2 | 2/2014 | Rogers et al. | |
| 8,673,040 B2 | 3/2014 | Handley et al. | |
| 8,709,139 B2 | 4/2014 | Veeser et al. | |
| 8,721,756 B2 | 5/2014 | Handley et al. | |
| 8,834,610 B2 | 9/2014 | Lundgren et al. | |
| 8,882,876 B2 | 11/2014 | Battenfeld et al. | |
| 8,950,587 B2 | 2/2015 | Thomson et al. | |
| 9,149,748 B2 | 10/2015 | Nagy et al. | |
| 9,149,749 B2 | 10/2015 | Nagy et al. | |
| 9,153,291 B2 | 10/2015 | Miller, III et al. | |
| 9,259,689 B2 | 2/2016 | Waller, Jr. et al. | |
| 9,303,339 B2 | 4/2016 | Gupta et al. | |
| 9,435,056 B2 | 9/2016 | Shenoy et al. | |
| 9,492,775 B2 | 11/2016 | Amsden et al. | |
| 9,511,330 B2 | 12/2016 | Yu et al. | |
| 9,587,328 B2 | 3/2017 | Shenoy et al. | |
| 9,662,600 B2 | 5/2017 | Parker | |
| 9,718,005 B2 | 8/2017 | Klein et al. | |
| 9,795,906 B2 | 10/2017 | Rogers et al. | |
| 9,885,154 B2 | 2/2018 | Gupta | |
| 9,950,284 B2 | 4/2018 | Thomson et al. | |
| 9,987,578 B2 | 6/2018 | Haberkamp et al. | |
| 10,058,808 B2 | 8/2018 | Haberkamp et al. | |
| 10,080,985 B2 | 9/2018 | Nagy et al. | |
| 10,137,394 B2 | 11/2018 | Tong et al. | |
| 10,252,200 B2 | 4/2019 | Anantharamaiah et al. | |
| 10,279,291 B2 | 5/2019 | Nagy et al. | |
| 10,293,288 B2 | 5/2019 | Chavan et al. | |
| 10,316,468 B2 | 6/2019 | Gupta | |
| 10,316,748 B2 | 6/2019 | Lans | |
| 10,343,095 B2 | 7/2019 | Jaganathan et al. | |
| 10,357,729 B2 | 7/2019 | Parker | |
| 10,363,505 B2 | 7/2019 | Parker | |
| 10,391,434 B2 | 8/2019 | Haberkamp et al. | |
| RE47,737 E | 11/2019 | Kahlbaugh et al. | |
| 10,537,837 B2 | 1/2020 | Haberkamp et al. | |
| 10,610,813 B2 | 4/2020 | Rogers et al. | |
| 10,653,979 B2 | 5/2020 | Barsness et al. | |
| 10,953,356 B2 | 3/2021 | Haberkamp et al. | |
| 10,974,182 B2 | 4/2021 | Schwandt et al. | |
| 11,090,590 B2 | 8/2021 | Nagy et al. | |
| 11,123,668 B2 | 9/2021 | Anantharamaiah et al. | |
| 11,167,232 B2 | 11/2021 | Jaganathan et al. | |
| RE49,097 E | 6/2022 | Kahlbaugh et al. | |
| 11,504,663 B2 | 11/2022 | Rogers et al. | |
| 2002/0046656 A1 | 4/2002 | Benson et al. | |
| 2003/0106294 A1 | 6/2003 | Chung et al. | |
| 2003/0164333 A1 | 9/2003 | Nohren et al. | |
| 2004/0116025 A1 | 6/2004 | Gogins et al. | |
| 2004/0116026 A1 | 6/2004 | Kubose et al. | |
| 2004/0180598 A1 | 9/2004 | Yang et al. | |
| 2004/0211160 A1 | 10/2004 | Rammig et al. | |
| 2005/0026526 A1 | 2/2005 | Verdegan et al. | |
| 2005/0160711 A1 | 7/2005 | Yang | |
| 2006/0096263 A1* | 5/2006 | Kahlbaugh ........ B01D 39/2089 55/528 |
| 2006/0096932 A1 | 5/2006 | Dema et al. | |
| 2006/0137317 A1 | 6/2006 | Bryner et al. | |
| 2006/0242933 A1 | 11/2006 | Webb et al. | |
| 2007/0131235 A1 | 6/2007 | Janikowski et al. | |
| 2008/0093778 A1 | 4/2008 | Johnson et al. | |
| 2008/0105626 A1 | 5/2008 | Jones et al. | |
| 2008/0110342 A1 | 5/2008 | Ensor et al. | |
| 2008/0149561 A1 | 6/2008 | Chu et al. | |
| 2008/0160856 A1 | 7/2008 | Chen et al. | |
| 2008/0197077 A1 | 8/2008 | Swartley et al. | |
| 2008/0302242 A1 | 12/2008 | Schelling et al. | |
| 2008/0314010 A1 | 12/2008 | Smithies et al. | |
| 2009/0120868 A1 | 5/2009 | Huppchen et al. | |
| 2009/0221812 A1 | 9/2009 | Ankerfors et al. | |
| 2009/0266759 A1 | 10/2009 | Green | |
| 2009/0272086 A1 | 11/2009 | Hsiao et al. | |
| 2010/0206803 A1 | 8/2010 | Ward et al. | |
| 2010/0282682 A1 | 11/2010 | Eaton et al. | |
| 2010/0307119 A1 | 12/2010 | Leung et al. | |
| 2010/0313753 A1 | 12/2010 | Calis et al. | |
| 2011/0138683 A1 | 6/2011 | Altamirano et al. | |
| 2011/0138685 A1 | 6/2011 | Kalayci et al. | |
| 2011/0174158 A1 | 7/2011 | Walls et al. | |
| 2011/0210059 A1 | 9/2011 | Green et al. | |
| 2011/0232653 A1 | 9/2011 | Imashiro et al. | |
| 2011/0259796 A1 | 10/2011 | Chen et al. | |
| 2012/0043038 A1 | 2/2012 | Dodd | |
| 2012/0137885 A1 | 6/2012 | Dullaert et al. | |
| 2012/0190264 A1 | 7/2012 | Mahammad et al. | |
| 2012/0234748 A1 | 9/2012 | Little et al. | |
| 2013/0068687 A1 | 3/2013 | Shenoy et al. | |
| 2013/0152948 A1 | 6/2013 | Inagaki et al. | |
| 2013/0233789 A1 | 9/2013 | Parker | |
| 2013/0340613 A1 | 12/2013 | Krupnikov et al. | |
| 2014/0020350 A1 | 1/2014 | Fu | |
| 2014/0043038 A1 | 2/2014 | Chen et al. | |
| 2014/0076797 A1 | 3/2014 | Jo et al. | |
| 2014/0110354 A1 | 4/2014 | Haberkamp et al. | |
| 2014/0123613 A1 | 5/2014 | Le Port et al. | |
| 2014/0275692 A1 | 9/2014 | Patel et al. | |
| 2014/0291222 A1 | 10/2014 | Behrendt et al. | |
| 2014/0360145 A1 | 12/2014 | Hamada et al. | |
| 2015/0157971 A1 | 6/2015 | Tong et al. | |
| 2015/0174509 A1 | 6/2015 | Swaminathan | |
| 2015/0298070 A1 | 10/2015 | Koslov et al. | |
| 2015/0354139 A1 | 12/2015 | Geisen et al. | |
| 2015/0360159 A1 | 12/2015 | Lee et al. | |
| 2016/0023146 A1* | 1/2016 | Hampton ........... D04H 1/43835 55/528 |
| 2016/0038864 A1 | 2/2016 | Calcaterra et al. | |
| 2016/0038865 A1* | 2/2016 | Jones .................... B01D 39/18 210/489 |
| 2016/0051918 A1 | 2/2016 | Walz et al. | |
| 2016/0051919 A1 | 2/2016 | Nagy et al. | |
| 2016/0051920 A1 | 2/2016 | Sato et al. | |
| 2016/0067641 A1 | 3/2016 | Rodriguez | |

(56) References Cited

U.S. PATENT DOCUMENTS

| | | |
|---|---|---|
| 2016/0074790 A1 | 3/2016 | Kuroda et al. |
| 2016/0136553 A1 | 5/2016 | Healey et al. |
| 2016/0136584 A1 | 5/2016 | Hwang et al. |
| 2016/0166953 A1 | 6/2016 | Swaminathan et al. |
| 2016/0166961 A1 | 6/2016 | Haberkamp et al. |
| 2016/0175748 A1 | 6/2016 | Park |
| 2016/0175752 A1 | 6/2016 | Jaganathan et al. |
| 2016/0243478 A1 | 8/2016 | Park |
| 2016/0256805 A1 | 9/2016 | Grein et al. |
| 2016/0279548 A1 | 9/2016 | Chavan et al. |
| 2016/0361674 A1 | 12/2016 | Swaminathan et al. |
| 2016/0367922 A1 | 12/2016 | Kamiyama |
| 2017/0028329 A1 | 2/2017 | Motomura et al. |
| 2017/0080368 A1 | 3/2017 | Smith et al. |
| 2017/0128892 A1 | 5/2017 | Yu et al. |
| 2017/0173509 A1 | 6/2017 | Giglia et al. |
| 2017/0232372 A1 | 8/2017 | Zhang et al. |
| 2017/0296953 A1 | 10/2017 | Parker |
| 2017/0304755 A1 | 10/2017 | Bansal et al. |
| 2017/0306148 A1 | 10/2017 | Bansal et al. |
| 2017/0319994 A1 | 11/2017 | Parker |
| 2017/0361254 A1 | 12/2017 | Huang et al. |
| 2018/0001247 A1 | 1/2018 | Jinka et al. |
| 2018/0085698 A1 | 3/2018 | Motomura et al. |
| 2018/0169551 A1 | 6/2018 | Jaganathan et al. |
| 2018/0178150 A1 | 6/2018 | Neumann et al. |
| 2018/0236385 A1 | 8/2018 | Jinka et al. |
| 2018/0272258 A1 | 9/2018 | Healey et al. |
| 2018/0280845 A1 | 10/2018 | Barlow, Jr. et al. |
| 2018/0280846 A1 | 10/2018 | Barlow, Jr. et al. |
| 2018/0280847 A1 | 10/2018 | Barlow, Jr. et al. |
| 2018/0361287 A1 | 12/2018 | Zhang et al. |
| 2019/0224598 A1 | 7/2019 | Chavan et al. |
| 2019/0255473 A1 | 8/2019 | Gao et al. |
| 2019/0314747 A1 | 10/2019 | Nagy et al. |
| 2020/0038793 A1 | 2/2020 | Jaganathan et al. |
| 2020/0078742 A1 | 3/2020 | Seo et al. |
| 2020/0171418 A1 | 6/2020 | Rezaei et al. |
| 2020/0391147 A1 | 12/2020 | Schmalz |
| 2021/0086116 A1 | 3/2021 | Shim et al. |
| 2021/0093989 A1 | 4/2021 | Doucoure et al. |
| 2021/0170317 A1 | 6/2021 | Janikowski et al. |
| 2021/0178300 A1 | 6/2021 | Schwandt et al. |
| 2021/0213378 A1 | 7/2021 | Shim et al. |
| 2021/0236971 A1 | 8/2021 | Umebayashi |
| 2021/0370208 A1 | 12/2021 | Yegya-Raman et al. |
| 2021/0370218 A1 | 12/2021 | Daus et al. |
| 2021/0387120 A1 | 12/2021 | Petri et al. |
| 2022/0047976 A1 | 2/2022 | Rao et al. |
| 2022/0162785 A1 | 5/2022 | Adachi et al. |
| 2022/0193587 A1 | 6/2022 | Cheng et al. |
| 2022/0379249 A1 | 12/2022 | Jones et al. |
| 2022/0387915 A1 | 12/2022 | Ignacio-De Leon et al. |
| 2023/0021769 A1 | 1/2023 | Jones et al. |
| 2023/0051258 A1 | 2/2023 | Jaganathan et al. |
| 2023/0149840 A1 | 5/2023 | Rogers et al. |

FOREIGN PATENT DOCUMENTS

| | | |
|---|---|---|
| CN | 101963102 A | 2/2011 |
| CN | 102015080 A | 4/2011 |
| CN | 105392544 A | 3/2016 |
| CN | 105451854 A | 3/2016 |
| CN | 106573191 A | 4/2017 |
| CN | 108330556 A | 7/2018 |
| CN | 109310936 A | 2/2019 |
| CN | 109562311 A | 4/2019 |
| CN | 110124413 A | 8/2019 |
| DE | 102013008391 A1 | 10/2014 |
| DE | 112013005087 T5 | 7/2015 |
| DE | 112014003579 T5 | 4/2016 |
| DE | 102015002672 A1 | 9/2016 |
| DE | 112015002324 T5 | 3/2017 |
| EP | 1764144 A1 | 3/2007 |
| EP | 1860236 A2 | 11/2007 |
| EP | 1894609 A1 | 3/2008 |
| EP | 1689510 B1 | 7/2009 |
| EP | 2589422 A2 | 5/2013 |
| EP | 2822670 A2 | 1/2015 |
| EP | 2958652 A1 | 12/2015 |
| EP | 2222385 B1 | 6/2016 |
| EP | 3029190 A1 | 6/2016 |
| EP | 3056597 A1 | 8/2016 |
| EP | 3064262 A1 | 9/2016 |
| EP | 3083003 A1 | 10/2016 |
| EP | 3100779 A1 | 12/2016 |
| EP | 3142774 A1 | 3/2017 |
| EP | 3225294 A1 | 10/2017 |
| EP | 2809433 B1 | 11/2017 |
| EP | 2987544 B1 | 12/2017 |
| EP | 3100779 B1 | 3/2018 |
| EP | 2361144 B1 | 5/2018 |
| EP | 2864019 B1 | 9/2018 |
| EP | 3416735 A1 | 12/2018 |
| EP | 3445470 A1 | 2/2019 |
| EP | 3056598 B1 | 4/2019 |
| EP | 3508265 A1 | 7/2019 |
| EP | 3519076 A1 | 8/2019 |
| EP | 3445899 A4 | 11/2019 |
| EP | 3233240 B1 | 2/2020 |
| EP | 3357564 B1 | 3/2020 |
| EP | 3738659 A1 | 11/2020 |
| EP | 3039177 B1 | 10/2021 |
| EP | 3895779 A1 | 10/2021 |
| EP | 3906991 A1 | 11/2021 |
| EP | 3781286 B1 | 6/2022 |
| ES | 2731684 T3 | 11/2019 |
| IN | 325621 B | 3/2014 |
| JP | H0312208 A | 1/1991 |
| JP | H04313313 A | 11/1992 |
| JP | H05295645 A | 11/1993 |
| JP | 2007170224 A | 7/2007 |
| JP | 2011512252 A | 4/2011 |
| JP | 2011089226 A | 5/2011 |
| JP | 2012516399 A | 7/2012 |
| JP | 2016176173 A | 10/2016 |
| JP | 6045687 B2 | 12/2016 |
| JP | 2017020507 A | 1/2017 |
| JP | 2018126721 A | 8/2018 |
| JP | 2019077962 A | 5/2019 |
| KR | 101416614 B1 | 7/2014 |
| KR | 101479752 B1 | 1/2015 |
| KR | 101479753 B1 | 1/2015 |
| PL | 233499 B1 | 10/2019 |
| WO | 2006049664 A1 | 5/2006 |
| WO | 2006052732 A2 | 5/2006 |
| WO | 2006089063 A2 | 8/2006 |
| WO | 2007133403 A2 | 11/2007 |
| WO | 2008142023 A2 | 11/2008 |
| WO | 2009014539 A1 | 1/2009 |
| WO | 2009067365 A2 | 5/2009 |
| WO | 2010009043 A2 | 1/2010 |
| WO | 2010124899 A1 | 11/2010 |
| WO | 2013043987 A1 | 3/2013 |
| WO | 2013170890 A1 | 11/2013 |
| WO | 2014130933 A1 | 8/2014 |
| WO | 2014164130 A1 | 10/2014 |
| WO | 2015016449 A1 | 2/2015 |
| WO | 2015017795 A2 | 2/2015 |
| WO | 2015053442 A1 | 4/2015 |
| WO | 2015053443 A1 | 4/2015 |
| WO | 2015091181 A2 | 6/2015 |
| WO | 2015157638 A2 | 10/2015 |
| WO | 2016022758 A1 | 2/2016 |
| WO | 2016100300 A8 | 7/2016 |
| WO | 2016205621 A1 | 12/2016 |
| WO | 2016210153 A1 | 12/2016 |
| WO | 2017184982 A1 | 10/2017 |
| WO | 2017196653 A1 | 11/2017 |
| WO | 2017214419 A1 | 12/2017 |
| WO | 2018011347 A1 | 1/2018 |
| WO | 2018175556 A1 | 9/2018 |
| WO | 2018193165 A1 | 10/2018 |
| WO | 2018208819 A1 | 11/2018 |

(56) References Cited

FOREIGN PATENT DOCUMENTS

| | | | |
|---|---|---|---|
| WO | 2019202212 A1 | 10/2019 | |
| WO | 2019202213 A1 | 10/2019 | |
| WO | 2020025956 A1 | 2/2020 | |
| WO | 2020052884 A1 | 3/2020 | |
| WO | 2020152551 A1 | 7/2020 | |
| WO | 2021072117 A1 | 4/2021 | |
| WO | 2021072122 A1 | 4/2021 | |
| WO | 2021203066 A1 | 10/2021 | |
| WO | 2021203067 A1 | 10/2021 | |
| WO | 2021203068 A1 | 10/2021 | |

OTHER PUBLICATIONS

Yoon et al., "High flux ultrafiltration membranes based on electrospun nanofibrous PAN scaffolds and chitosan coating," Polymer, 2006, vol. 47, pp. 2434-2441.

Wikipedia, "Powered air-purifying respirator," retrieved from the Internet on Mar. 20, 2023, <URL:https:en.wikipedia.org/wiki/Powered_air-purifying_respirator>, 5 pages.

Wertz et al., "Filtration media: Advantages of nanofibre coating technology," Filtration & Separation, Jul./Aug. 2009, vol. 46, No. 4, pp. 18-20.

Wang et al., "Computational characterization of nonwoven fibrous media: 1. Pore-network extractionand morphological analysis," Physical Review Materials, 2020, vol. 4, No. 083803, 11 pages.

Cerex Advanced Fabrics, Inc., "Benefits of Spunbond Substrate Uniformity in Advanced Filtration Media," date unavailable but believed to be available as early as 2018, retrieved from the Internet on Dec. 5, 2019, <URL:https://www.cerex.com/wp-content/uploads/2018/03/benefits-of-spunbond-substrate-uniformity-in-advanced-filtration-media.pdf>, 19 pages.

Chinga-Carrasco, "Cellulose fibres, nanofibrils and microfibrils: The morphological sequence of MFC components from a plant physiology and fibre technology point of view," Nanoscale Research Letters, 2011, vol. 6, No. 417, 7 pgs.

Fong et al., "Beaded nanofibers formed during electrospinning," Polymer, 1999, vol. 40, pp. 4585-4592.

Hollingsworth & Vose, "Technostat Electrostatic Filter Media," Mar. 8, 2011, 2 pages.

Hollingsworth & Vose, Technostat® Product Information, 2023, retrieved from the Internet on Mar. 20, 2023, <URL: https://www.hollingsworth-vose.com/brands/filtration/technostat/>, 5 pages.

Hutten, Handbook of Nonwoven Filter Media, Butterworth-Heinemann, an imprint of Elsevier: Oxford, UK; 2007, 13 pgs.

International Prelimary Report on Patentability in PCT/US2020/054844, mailed Apr. 12, 2022, 7 pages.

International Preliminary Report on Patentability in PCT/US2020/054837, mailed Apr. 12, 2022, 7 pages.

International Preliminary Report on Patentability in PCT/US2021/025673, mailed Sep. 29, 2022, 7 pages.

International Preliminary Report on Patentability in PCT/US2021/025674, mailed Sep. 29, 2022, 7 pages.

International Preliminary Report on Patentability in PCT/US2021/025676, mailed Sep. 29, 2022, 14 pages.

International Search Report and Written Opinion in PCT/US2020/054837, mailed Jan. 14, 2021, 10 pages.

International Search Report and Written Opinion in PCT/US2021/025674, mailed Jul. 19, 2021, 10 pages.

International Search Report and Written Opinion in PCT/US2021/025676, mailed Sep. 16, 2021, 19 pages.

International Search Report and Written Opinion in PDT/US2021/025673, mailed Jul. 19, 2021, 10 pages.

International Search Report and Written Opinion in PCT/US2020/054844, mailed Jan. 26, 2021, 9 pages.

Invitation to Pay Additional Fees in PCT/US2021/025676, mailed Jul. 26, 2021, 12 pages.

Teijin Aramind, "A truee all-around para-aramid performer," Twaron® Product Brochure, Nov. 6, 2018, 9 pages.

Superior Felt & Filtration, Sub-Micron Fibers—Technostat® Filter Media for Air & Liquid Applications, 2017, 8 pages.

Subbiah et al., "Electrospinning of Nanofibers," Journal of Applied Polymer Science, 2005, vol. 96, pp. 557-569.

Kirsch et al., "Studies on Fibrous Aerosol Filters—III Diffusional Deposition of Aerosol in Fibrous Filter," Ann. Occup. Hyg., 1968, vol. 11, pp. 299-304 (Abstract Only).

Ma et al., "Fabrication and characterisation of cellulose nanofiber based thin-film nanofibrous composite membranes," Journal of Membrane Science, 2014, vol. 454, pp. 272-282.

Purchas, Handbook of Filter Media, 1st Edition, Elsevier Advanced Technology: Oxford, UK; 1996, pp. 152 and 154.

Sheffield, "Changes in Filtration and Contamination," Schroeder Industries, retrieved from the Internet Dec. 7, 2019 <URL:https://www.machinerylubrication.com/Articles/Print/704>, 5 pages.

"The new Filter Media Synteq XP" Brochure, Donaldson Filtration Soltions, Apr. 2009, 4 pages.

\* cited by examiner

FILTRATION MEDIA

CROSS REFERENCE TO RELATED APPLICATIONS

This application is the § 371 U.S. National Stage of International Application No. PCT/US2021/025673, filed 2 Apr. 2021, which claims the benefit of U.S. Provisional Application No. 63/004,926, filed 3 Apr. 2020, and of U.S. Provisional Application No. 63/081,143, filed 21 Sep. 2020, the disclosures of which are incorporated by reference herein in their entireties.

BACKGROUND

Filtration media, such as the filtration media used for fuel filtration, often include glass microfibers. During certain types of filtration, however, there is a concern that glass microfibers may be released from the filtration media resulting in environmental contamination or, in the case of filtered fuel, resulting in damage to the internal combustion engine.

SUMMARY OF THE INVENTION

This disclosure describes a filtration medium that is preferably substantially glass-free or glass-free. In some embodiments when the filtration medium is substantially glass-free or glass-free, the filtration medium preferably exhibits capacity and efficiency comparable to or better than similar glass-containing filtration media.

In one aspect, this disclosure provides a nonwoven filtration medium including: 25 wt-% to 85 wt-% of a bicomponent fiber having a fiber diameter in a range of 5 microns to 25 microns and a fiber length of 0.1 cm to 15 cm; 5 wt-% to 50 wt % of a small efficiency fiber having a fiber diameter of at least 0.1 micron and less than 1 micron; 10 wt-% to 50 wt % of large efficiency fiber having a fiber diameter in a range of 1 micron to 5 microns; and 5 wt-% to 25 wt % of a microfibrillated fiber, wherein a majority of the microfibrillated fibers have a lateral dimension of up to 4 microns; wherein the nonwoven filtration medium is substantially free of glass fiber.

In some embodiments, the bicomponent fiber includes a structural polymer portion and a thermoplastic binder polymer portion, wherein the structural polymer portion has a melting point higher than the melting point of the binder polymer portion. In some embodiments, the structural polymer portion of the bicomponent fiber has a melting point of at least 240° C. and the binder polymer portion of the bicomponent fiber has a melting point in a range of 100° C. to 190° C.

In some embodiments, the small efficiency fiber has a fiber diameter of at least 0.4 micron to less than 1 micron.

In some embodiments, the large efficiency fiber has a fiber diameter in a range of 2 microns to 4 microns.

In some embodiments, the small efficiency fiber includes PET or the large efficiency fiber includes PET; or both the small efficiency fiber and the large efficiency fiber include PET.

In some embodiments, the microfibrillated fibers comprise microfibrillated cellulose fibers.

In some embodiments, the nonwoven filtration medium has a solidity in a range of 5% to 15%. In some embodiments, the nonwoven filtration medium has a basis weight in a range of 24 g/m² to 100 g/m². In some embodiments, the nonwoven filtration medium has a pore size in a range of 0.5 micron to 20 microns. In some embodiments, the nonwoven filtration medium has a P95/P50 ratio in a range of 1.5 to 3. In some embodiments, the nonwoven filtration medium has a thickness in a range of 0.12 mm to 1 mm. In some embodiments, the nonwoven filtration medium has a permeability in a range of 1 ft³/ft²/min at 0.5 inches of water to 100 ft³/ft²/min at 0.5 inches of water.

In some embodiments, the nonwoven filtration medium is substantially free of resin.

In some embodiments, the nonwoven filtration medium is free of glass fiber.

In another aspect, this disclosure describes a method of filtering a liquid stream, the method including passing a liquid stream comprising a contaminant through a nonwoven filtration medium and removing the contaminant from the liquid stream. In some embodiments, the liquid stream comprises fuel, hydraulic oil, process water, air, diesel engine fluid (DEF), diesel engine lube oil, or blow-by gas, or a combination thereof.

As used herein, micron is equivalent to micrometer (μm).

As used herein, a "fiber" has an average fiber diameter of up to 100 micrometers.

As used herein, "fibers" have an aspect ratio (i.e., length to lateral dimension) of greater than 3:1, and preferably greater than 5:1. For example, fiberglass typically has an aspect ratio of greater than 100:1. In this context, the "lateral dimension" is the width (in 2 dimensions) or diameter (in 3 dimensions) of a fiber. The term "diameter" refers either to the diameter of a circular cross-section of a fiber, or to a largest cross-sectional dimension of a non-circular cross-section of a fiber. Fiber lengths may be of finite lengths or infinite lengths, depending on the desired result.

As used herein, the "β ratio" or "β" is the ratio of upstream particles to downstream particles under steady flow conditions (ISO 16889:2008), as described in the Examples. The more efficient the filter, the higher the β ratio. The β ratio is defined as follows:

$$\beta_d = \frac{N_{d,U}}{N_{d,D}}$$

where $N_{d,U}$ is the upstream particle count per unit fluid volume for particles of diameter d or greater and $N_{d,D}$ is the downstream particle count per unit fluid volume for particles of diameter d or greater. If present, a subscript attached to β (e.g., d) indicates the particle size for which the ratio is being reported.

As used herein, unless indicated otherwise, pore size (for example P5, P50, and P95) and ratios of pore sizes (for example, P95/P50) are determined using capillary flow porometry. Capillary flow porometry may be performed using a continuous pressure scan mode. It may be useful to use silicone oil, having a surface tension of 20.1 dynes/cm and a wetting contact angle of 0, as a wetting liquid. The sample may initially be tested dry, varying low pressure to high pressure, and then tested wet, again varying low pressure to high pressure. The test is typically performed at ambient temperature conditions (for example, 20° C. to 25° C.). 256 data points may be collected across the range of the scan of the pressures for both the dry curve and the wet curve. Typically, no tortuosity factor and/or a shape factor will be used (that is, for comparison to other test methods that use an adjustment factor, a factor equal to 1 may be used).

As used herein, a value P(x %) is the calculated pore size when the wet curve is equal to (100-x) % of the dry curve, as determined using the methodology described herein. Although a calculated value, this can be understood as representing the point at which x % of the overall flow through the layer passes through pores of that size or below. For example, P50 (the mean flow pore size) represents the point at which the wet curve is equal to half the dry curve, and may be viewed as the pore size such that 50% of the total flow through the layer is through pores of that size or below.

As used herein, "pressure drop" (also referred to herein as "dP" or "ΔP") relates to the pressure (exerted by a pump) necessary to force fluid through the filter or filter medium (prior to the addition of a contaminant) for a particular fluid velocity. Unless otherwise indicated, pressure drop is clean pressure drop, measured as described in ISO 16889:2008. The sample may be tested using a test flow rate of 16 L/minute. The test may be performed to a terminal element differential pressure of 320 kPa.

The term "substantially free of" as used herein indicates that the filtration medium does not contain an amount of the listed component (for example, glass fiber or resin) that contributes to the activity or action of the filtration medium to any substantial extent. The term is intended to include the inclusion of insignificant amounts of the component that do not provide any substantial contribution to the filtration medium's filtration properties. For example, a filtration medium that is substantially free of glass may include less than 1 wt-% glass fiber. For example, a filtration medium that is substantially free of resin may include less than 5 wt-% resin. For example, a filtration medium that is substantially free of glass may include less than 1 wt-% glass fiber. For example, a filtration medium that is substantially free of resin may include less than 5 wt-% resin.

The term "free of" as used herein indicates that the filtration medium does not contain an amount of the listed component (for example, glass fiber or resin). For example, a "glass-free" filtration medium does not include any glass and a "resin-free" media does not include any resin.

Any reference to standard methods (e.g., ASTM, TAPPI, etc.) refer to the most recent available version of the method at the time of filing of this disclosure unless otherwise indicated.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
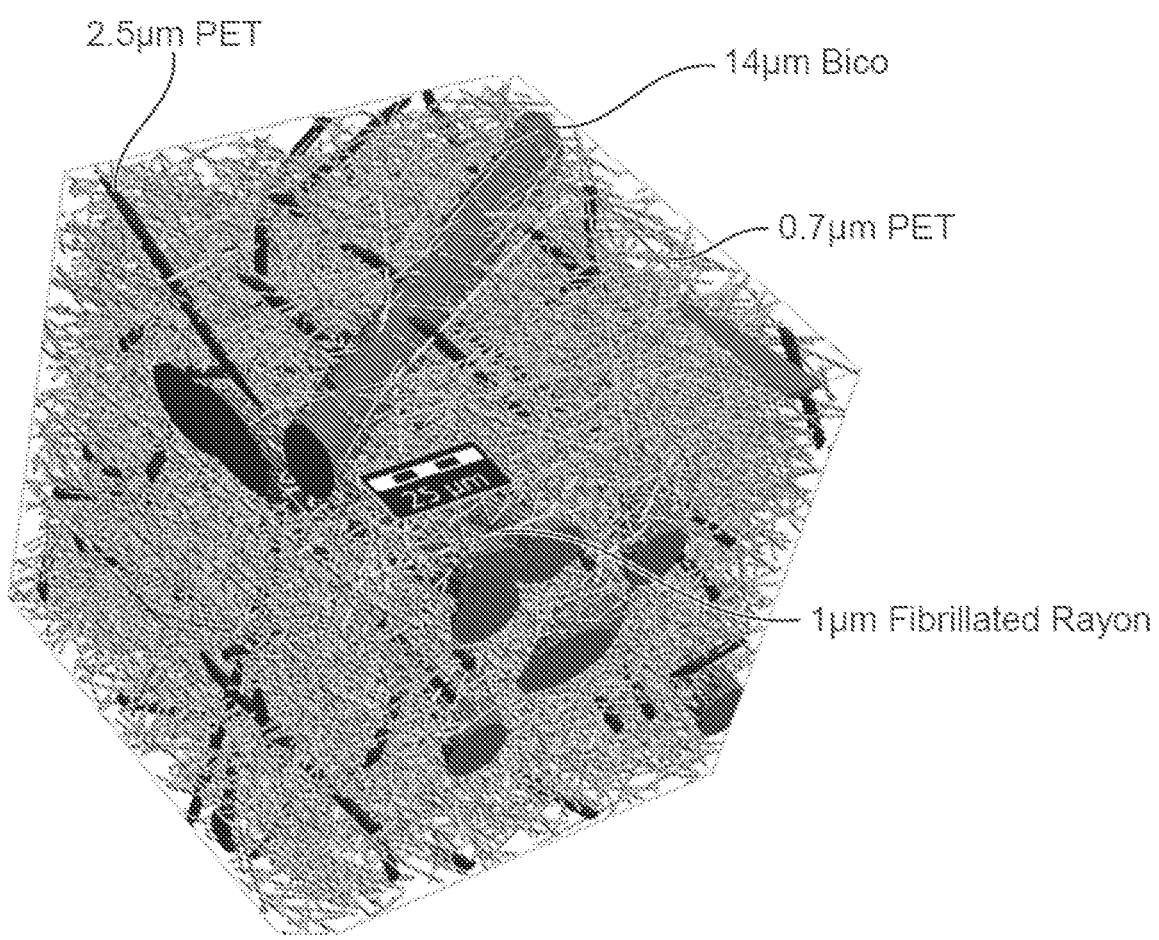
FIG. 1 shows a pictorial representation of a simulation of a glass-free filtration media including 14 μm-diameter bicomponent (Bico) fibers, 0.7 μm-diameter polyethylene terephthalate (PET) fibers, 2.5 μm-diameter PET fibers, and 1 μm-diameter microfibrillated rayon fibers, as further described in Example 1. The simulation of the rayon fibers does not depict the full extent of their bundle properties.

This disclosure describes a filtration medium that is preferably substantially glass-free or glass-free. In some embodiments when the filtration medium is substantially glass-free or glass-free, the filtration medium preferably exhibits capacity and efficiency comparable to or better than similar glass-containing filtration media.

Filtration Medium

In one aspect this disclosure describes a filtration medium. The filtration medium is a non-woven filtration medium. The nonwoven filtration medium is substantially free of glass including, for example, a glass fiber. In some embodiments, the nonwoven filtration medium does not include glass.

In some embodiments, the nonwoven filtration medium includes: a bicomponent fiber; a "small efficiency fiber" wherein the "small efficiency fiber" as used herein is a fiber having a fiber diameter of at least 0.1 micron and less than 1 micron; a "large efficiency fiber" wherein a "large efficiency fiber" as used herein is a fiber having a fiber diameter in a range of 1 micron to 5 microns; and a microfibrillated fiber.

In some embodiments, small efficiency fiber or the large efficiency fiber or both preferably include polyethylene terephthalate (PET).

In an exemplary embodiment, the nonwoven filtration medium includes: 25 wt-% to 85 wt-% of a bicomponent fiber having a fiber diameter in a range of 5 microns to 25 microns and a fiber length in a range of 0.1 cm to 15 cm; 5 wt-% to 50 wt % of the small efficiency fiber; 10 wt-% to 50 wt % of the large efficiency fiber; and 5 wt-% to 25 wt % of a microfibrillated fiber, wherein a majority of the microfibrillated fibers have a lateral dimension of up to 4 microns.

One exemplary embodiment is shown in Example 2. As further described in Example 2, the inclusion of a fiber having a fiber diameter of at least 0.1 micron and less than 1 micron (700 nm) and a fiber having a fiber diameter in a range of 1 micron to 5 microns (2.5 μm) allowed for similar efficiencies (β) to be achieved while providing a more open structure that will prevent unwanted pressure drop. As shown in Example 3, these efficiencies can also be obtained without the use of a fiber having a fiber diameter of at least 0.1 micron and less than 1 micron (see FIG. 3), but such media is expected to be denser, resulting in an undesirable, higher pressure drop (dP).

It is well known in the art that using smaller size fibers will produce higher efficiency filter media. But a nonwoven filtration medium that included only bicomponent fiber and a fiber having a fiber diameter of at least 0.1 micron and less than 1 micron would have very low strength, specifically the strength of the fiber matrix of the 0.1 micron to 1 micron fiber that form in the space between the larger bicomponent fibers, making it unsuitable for many uses, particularly those in which the filter media was subjected to dynamic forces. Although strength could be increased by including resin, using resin is undesirable because it fills pores in the media that could otherwise be used to collect contaminant and because it increases pressure drop.

Figure 4:
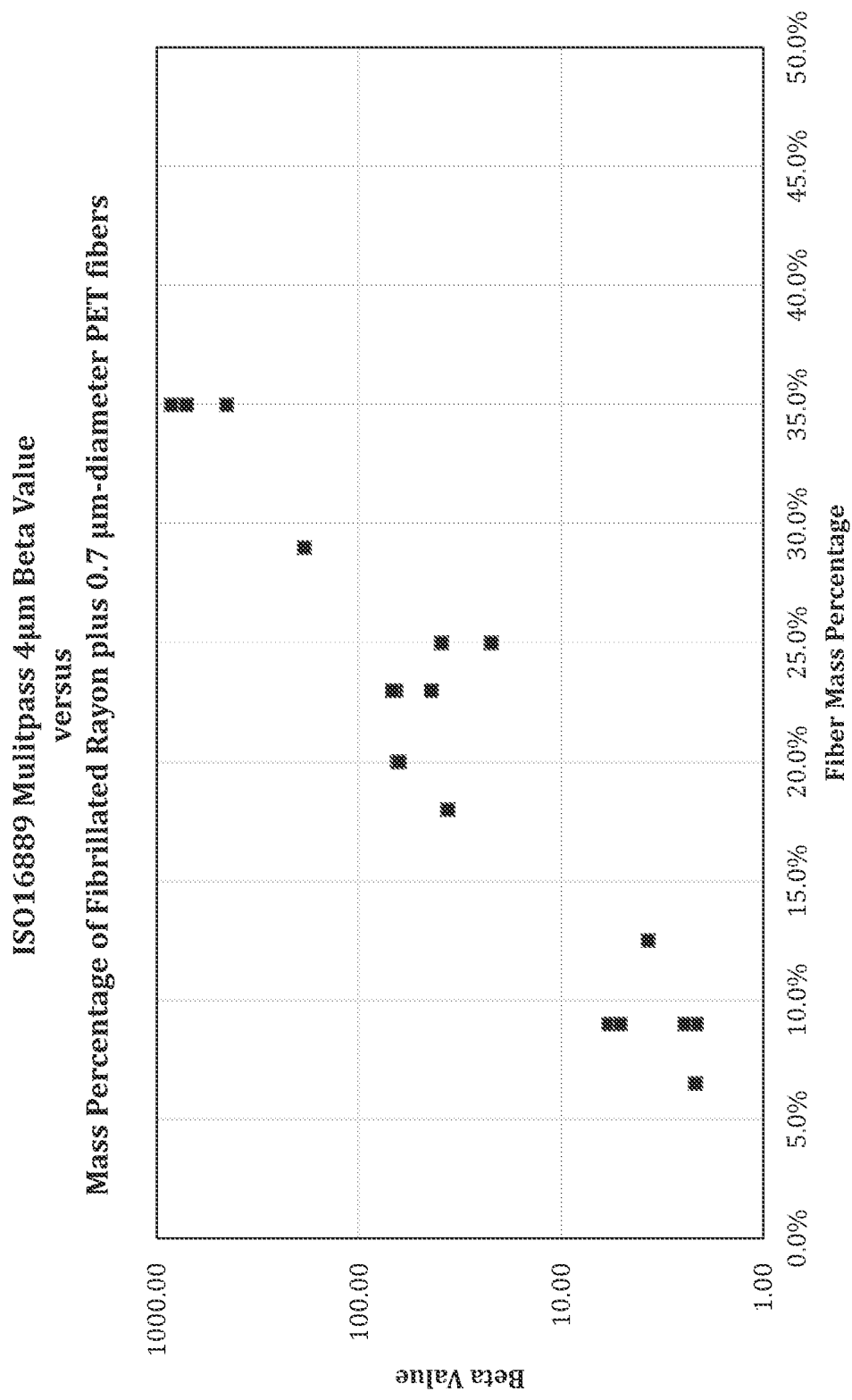
FIG. 4 shows $\beta_{4\ \mu m}$ plotted against the fiber mass percentage of microfibrillated rayon and 700 nm PET in media with differing amounts of each fiber type, as further described in Example 4.
Figure 6A:
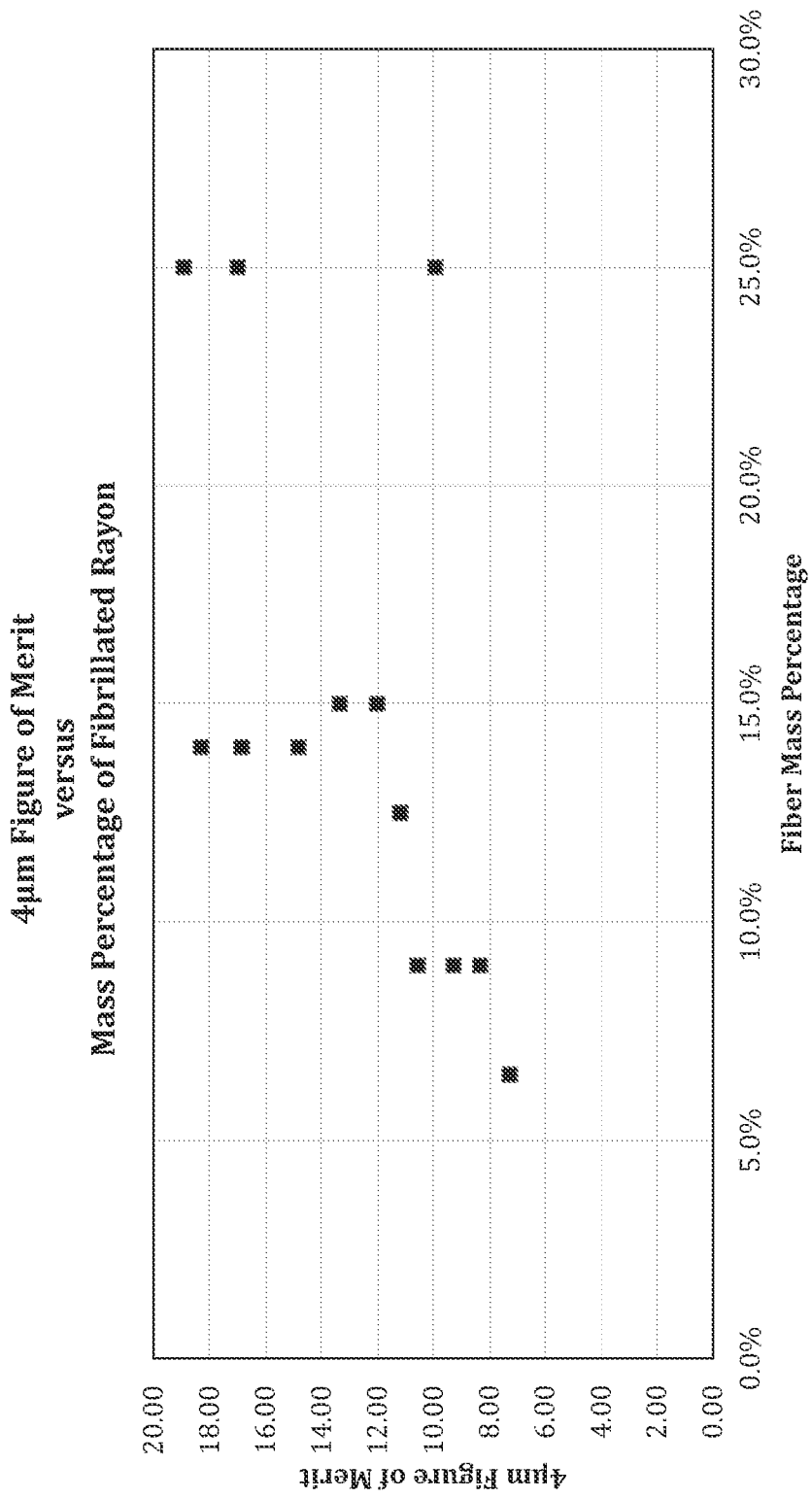
FIG. 6A shows the Figure of Merit (FOM) plotted against the fiber mass percentage of microfibrillated rayon in media with differing amounts of microfibrillated rayon, as further described in Example 4.

As shown by the results of Example 4, including increasing amounts of a microfibrillated fiber and a fiber having a fiber diameter of at least 0.1 micron and less than 1 micron (700 nm) increases efficiency (see FIG. 4). Using increasing amounts of a microfibrillated fiber resulted in increased filter media performance, as indicated by Figure of Merit (FOM), a measure of the performance of a filter media and of the filter media's ability to provide a certain level of clarification of a stream with a minimum energy used (FIG. 6A). In addition, using increased amounts of microfibrillated fibers increase the fiber entanglement and thus increased strength of the fiber matrix. Increased strength can also be gained by using materials that can form hydrogen bonds, such as rayon and cellulose.

Figure 5A:
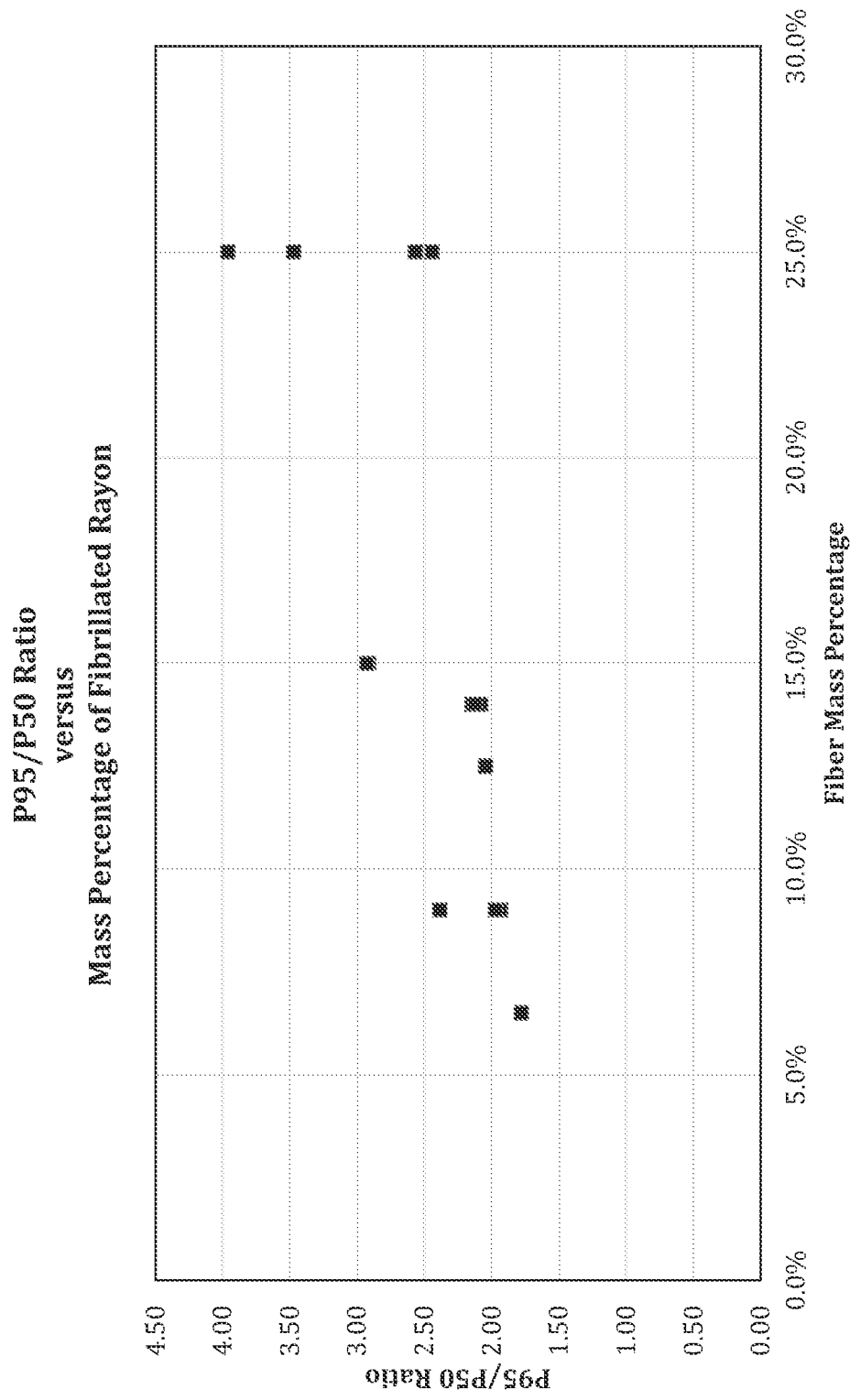
FIG. 5A shows the P95/P50 plotted against the fiber mass percentage of microfibrillated rayon in media with differing amounts of microfibrillated rayon, as further described in Example 4.

But using increasing amounts of a microfibrillated fiber also results in an increasing P95/P50 ratio (FIG. 5A), indicating that uniformity of the pore sizes of the media decreases with increasing amounts of a microfibrillated fiber. In contrast, adding increasing amounts of a large efficiency fiber (that is, a fiber having a fiber diameter in a range of 1 micron to 5 microns) results in an decreasing P95/P50 ratio (FIG. 5B), indicating that uniformity of the pore sizes of the media increases with increasing amounts of a large efficiency fiber.

Thus, it is necessary to balance the proportions of bicomponent fibers, small efficiency fibers, large efficiency fibers, and microfibrillated fibers to attain a glass-free media having a desired efficiency, strength, and uniformity. For example, to increase uniformity, it may be desired to increase the proportion of large efficiency fiber. To increase efficiency, it may be desired to increase the proportion of small efficiency fibers.

In some embodiments, one or more of the fibers is selected or treated to alter the electrostatic charge of the media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

Bicomponent Fibers

The filtration medium includes a bicomponent fiber. Any suitable bicomponent fiber may be used, and the bicomponent fiber may be selected depending on the intended use for the media.

In some embodiments, the filtration medium includes at least 25 wt-%, at least 30 wt-%, at least 35 wt-%, at least 40 wt-%, at least 45 wt-%, at least 50 wt-%, at least 55 wt-%, at least 60 wt-%, at least 65 wt-%, or at least 70 wt-% of the bicomponent fiber. In some embodiments, the filtration medium includes up to 30%, up to 35 wt-%, up to 40 wt-%, up to 45 wt-%, up to 50 wt-%, up to 55 wt-%, up to 60 wt-%, up to 65 wt-%, up to 70 wt-%, up to 75 wt-%, or up to 85 wt-% of the bicomponent fiber. In an exemplary embodiment, the filtration medium includes 25 wt-% to 85 wt-% of the bicomponent fiber. In another exemplary embodiment, the filtration medium includes 25 wt-% to 75 wt-% of the bicomponent fiber. In yet another exemplary embodiment, the filtration medium includes 25 wt-% to 70 wt-% of the bicomponent fiber. In a further exemplary embodiment, the filtration medium includes 50 wt-% of the bicomponent fiber.

In some embodiments, the bicomponent fiber has a fiber diameter of at least 1 micron, at least 5 microns, at least 10 microns, at least 15 microns, or at least 20 microns. In some embodiments, the bicomponent fiber has a fiber diameter of up to 5 microns, up to 10 microns, up to 15 microns, up to 20 microns, up to 25 microns, or up to 30 microns. In an exemplary embodiment, the bicomponent fiber has a fiber diameter in a range of 5 microns to 25 microns. In another exemplary embodiment, the bicomponent fiber has a fiber diameter of 14 microns.

In some embodiments, the bicomponent fiber has a fiber length of at least 0.1 cm, at least 0.5 cm, or at least 1 cm. In some embodiments, the bicomponent fiber has a fiber length of up to 0.5 cm, up to 1 cm, up to 5 cm, up to 10 cm, or up to 15 cm. In an exemplary embodiment, the bicomponent fiber has a fiber length in a range of 0.1 cm to 15 cm. In another exemplary embodiment, the bicomponent fiber has a fiber length of 6 mm.

In some embodiments, the bicomponent fiber includes a structural polymer portion and a thermoplastic binder polymer portion, the structural polymer portion having a melting point of higher than that of the binder polymer portion.

The structural polymer portion and the binder polymer portion may be made out of any suitable materials. For example, the structural polymer portion may include PET and the binder polymer portion may include copolymer PET (coPET). In additional examples, the structural polymer portion may include PET and the binder polymer portion may include Polyethylene (PE), PET, nylon, polypropylene (PP), polytetrafluoroethylene (PTFE), polyethersulfone (PES), polyphenylene sulfide (PPS), meta-aramids, or para-aramids. In further examples, the binder polymer portion may include polyethylene (PE), poly lactic acid (PLA), nylon, ethylene vinyl alcohol (EVOH), polyvinyl chloride (PVC), polyvinylidene fluoride (PVDF) (for example, KYNAR), or any other polymer or modified polymer that is designed with a lower melting temperature than the core structure polymer.

In some embodiments, the structural polymer portion is the core and the thermoplastic binder polymer portion is the sheath of the bicomponent fiber.

In some embodiments, the structural polymer portion of the bicomponent fiber has a melting point of at least 240° C. and the binder polymer portion of the bicomponent fiber has a melting point of up to 115° C. An exemplary bicomponent fiber wherein the structural polymer portion has a melting point of at least 240° C. and the binder polymer portion has a melting point of up to 115° C. is 271P, a 14 μm-diameter fiber available from Advansa (Hamm, Germany).

In some embodiments, the structural polymer portion of the bicomponent fiber has a melting point of at least 240° C. and the binder polymer portion of the bicomponent fiber has a melting point in a range of 100° C. to 190° C. In one exemplary embodiment, the structural polymer portion of the bicomponent fiber has a melting point of at least 240° C. and the binder polymer portion of the bicomponent fiber has a melting point in a range of 120° C. to 170° C. In another exemplary embodiment the structural polymer portion of the bicomponent fiber has a melting point of at least 240° C. and the binder polymer portion of the bicomponent fiber has a melting point in a range of 140° C. to 160° C.

Exemplary bicomponent fibers wherein the structural polymer portion has a melting point of at least 240° C. and the binder polymer portion has a melting point of in a range of 100° C. to 190° C. are TJ04CN (having a binder polymer portion melting point of 110° C.), TJ04BN (having a binder polymer portion melting point of 150° C.), both available from Teijin Fibers Limited of Osaka, Japan; 271P (having a binder polymer portion melting point of 110° C.), available from Advansa of Hamm, Germany; and T-202 or T-217 (each having a binder polymer portion melting point of 180° C.), both available from Fiber Innovation Technology, Inc. of Johnson City, TN.

In some embodiments, the bicomponent fiber may include a first bicomponent fiber and a second bicomponent fiber. In an exemplary embodiment, the bicomponent fiber may include a first bicomponent fiber wherein the structural portion has a melting point of at least 240° C. and the binder polymer portion has a melting point of up to 115° C. and a second bicomponent fiber wherein the structural polymer portion has a melting point of at least 240° C. and the binder polymer portion has a melting point in a range of 100° C. to 190° C. For example, the bicomponent fiber may include both Advansa 271P and TJ04BN.

Small Efficiency Fiber

The filtration medium includes a "small efficiency fiber" wherein the "small efficiency fiber" as used herein is a fiber having a fiber diameter of at least 0.1 micron and less than 1 micron.

In some embodiments, the small efficiency fiber is preferably a PET fiber. In some embodiments, the small efficiency fiber may consist essentially of PET. In some embodiments, the small efficiency fiber may consist of PET.

Additionally or alternatively, the small efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the filtration medium includes at least 5 wt-%, at least 10 wt-%, at least 15 wt-%, at least 20 wt-%, at least 25 wt-%, at least 30 wt-%, at least 35 wt-%, at least 40 wt-%, or at least 45 wt-% of the small efficiency fiber. In some embodiments, the filtration medium includes up to 15 wt-%, up to 20 wt-%, up to 25 wt-%, up to 30 wt-%, up to 35 wt-%, up to 40 wt-%, up to 45 wt-%, up to 50 wt-%, or up to 55 wt-% of the small efficiency fiber. In an exemplary embodiment, the filtration medium includes 5 wt-% to 50 wt-% of the small efficiency fiber. In another exemplary embodiment, the filtration medium includes 10 wt-% to 50 wt-% of the small efficiency fiber. In yet another exemplary embodiment, the filtration medium includes 10 wt-% to 40 wt-% of the small efficiency fiber. In a further exemplary embodiment, the filtration medium includes 10 wt-% to 25 wt-% of the small efficiency fiber.

In some embodiments, the small efficiency fiber has a fiber diameter of at least 0.1 micron, at least 0.2 micron, at least 0.3 micron, at least 0.4 micron, at least 0.5 micron, at least 0.6 micron, or at least 0.7 micron. In some embodiments, the small efficiency fiber has a fiber diameter of up to 0.7 micron, up to 0.8 micron, up to 0.9 micron, or less than 1 micron. For example, in an exemplary embodiment, the small efficiency fiber has a fiber diameter of at least 0.4 micron and less than 1 micron. In another exemplary embodiment, the small efficiency fiber has a fiber diameter in a range of 0.6 micron to 0.8 micron. In a further exemplary embodiment, the small efficiency fiber has a fiber diameter of 0.7 micron.

In the Examples, the small efficiency fiber is a PET fiber having a fiber diameter of 0.7 micron.

In some embodiments, the small efficiency fiber has a length of at least 0.5 mm, at least 1 mm, or at least 1.5 mm. In some embodiments, the small efficiency fiber has a length of up to 10 mm, up to 11 mm, up to 12 mm, or up to 15 mm. In an exemplary embodiment, the small efficiency fiber has a length in a range of 1 mm to 15 mm. In a further exemplary embodiment, the small efficiency fiber has a length in a range of 1 mm to 12 mm.

In some embodiments, when the small efficiency fiber includes PET, the PET of the small efficiency fiber preferably has a melting point of at least 250° C., more preferably at least 275° C., even more preferably at least 290° C.

Large Efficiency Fiber

The filtration medium further includes a "large efficiency fiber" wherein a "large efficiency fiber" as used herein is a fiber having a fiber diameter in a range of 1 micron to 5 microns.

In some embodiments, the large efficiency fiber is preferably a PET fiber. In some embodiments, the large efficiency fiber may consist essentially of PET. In some embodiments, the large efficiency fiber may consist of PET.

Additionally or alternatively, the large efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the filtration medium includes at least 10 wt-%, at least 15 wt-%, at least 20 wt-%, at least 25 wt-%, or at least 30 wt-% of the large efficiency fiber. In some embodiments, the filtration medium includes up to 15 wt-%, up to 20 wt-%, up to 25 wt-%, up to 30 wt-%, up to 35 wt-% of the large efficiency fiber, up to 40 wt-% of the large efficiency fiber, up to 45 wt-% of the large efficiency fiber, or up to 50 wt-% of the large efficiency fiber. In an exemplary embodiment, the filtration medium includes 10 wt-% to 50 wt-% of the large efficiency fiber. In another exemplary embodiment, the filtration medium includes 10 wt-% to 40 wt-% of the large efficiency fiber. In another exemplary embodiment, the filtration medium includes 10 wt-% to 25 wt-% of the large efficiency fiber.

In some embodiments, the large efficiency fiber has a fiber diameter of at least 1 micron, at least 1.5 microns, at least 2 microns, at least 3 microns, or at least 4 microns. In some embodiments, the large efficiency fiber has a fiber diameter of up to 1.5 microns, up to 2 microns, up to 3 microns, up to 4 microns, or up to 5 microns. For example, in an exemplary embodiment, the large efficiency fiber has a fiber diameter in a range of 2 microns to 4 microns. In another exemplary embodiment, the large efficiency fiber has a fiber diameter in a range of 2 microns to 3 microns. In yet another exemplary embodiment, the large efficiency fiber has a fiber diameter of 2.5 microns. In a further exemplary embodiment, the large efficiency fiber has a fiber diameter of 2.7 microns.

In the Examples, the small efficiency fiber is a PET fiber having a fiber diameter of 2.7 microns.

In some embodiments, the large efficiency fiber has a length of at least 0.5 mm, at least 1 mm, or at least 1.5 mm. In some embodiments, the large efficiency fiber has a length of up to 10 mm, up to 11 mm, up to 12 mm, or up to 15 mm. In an exemplary embodiment, the large efficiency fiber has a length in a range of 1 mm to 15 mm. In a further exemplary embodiment, the large efficiency fiber has a length in a range of 1 mm to 12 mm.

In some embodiments, when the large efficiency fiber includes PET, the PET of the large efficiency fiber preferably has a melting point of at least 250° C., more preferably at least 275° C., even more preferably at least 290° C.

Microfibrillated Fibers

The nonwoven filtration medium includes a microfibrillated fiber. As used herein, a microfibrillated fiber is a fiber that has been processed to develop fibers with a higher surface area, branched structure than unprocessed fibers.

In some embodiments, the microfibrillated fiber may be a microfibrillated acrylic fiber, including, for example, fibrillated CFF fibers (available from Engineered Fiber Technology, Shelton, CT). In some embodiments, the microfibrillated fiber may be a microfibrillated cellulose fiber including, for example, rayon such as Lyocell or TENCEL. In some embodiments, the microfibrillated fiber may be a microfibrillated para-aramid fiber including, for example, TWARON Pulp (Teijin Aramid, B.V., The Netherlands). In some embodiments, the microfibrillated fiber may be a microfibrillated liquid crystal polymer (LCP) fiber, including, for example, microfibrillated VECTRAN fibers (available from Engineered Fiber Technology, Shelton, CT). In some embodiments, the microfibrillated fiber may be a microfibrillated poly-p-phenylene benzobisoxazole (PBO) fiber including, for example, fibrillated ZYLON fibers (available from Engineered Fiber Technology, Shelton, CT).

In some embodiments, the filtration medium includes at least 5 wt-%, at least 10 wt-%, at least 15 wt-%, at least 20 wt-%, at least 25 wt-%, or at least 30 wt-% of the microfibrillated fiber. In some embodiments, the filtration medium includes up to 15 wt-%, up to 20 wt-%, up to 25 wt-%, up to 30 wt-%, up to 35 wt-% of the microfibrillated fiber, or up to 40 wt-% of the microfibrillated fiber. In an exemplary embodiment, the filtration medium includes 5 wt-% to 40 wt-% of the microfibrillated fiber. In another exemplary embodiment, the filtration medium includes 5 wt-% to 25 wt-% of the microfibrillated fiber. In a further exemplary embodiment, the filtration medium includes 10 wt-% to 40 wt-% of the microfibrillated fiber. In yet another exemplary embodiment, the filtration medium includes 10 wt-% to 25 wt-% of the microfibrillated fiber. In additional exemplary embodiments, the filtration medium includes 12.5 wt-% or 25 wt-% of the microfibrillated fiber.

In some embodiments, the microfibrillated fiber include a microfibrillated cellulose. As used herein, microfibrillated cellulose (MFC) herein refers to that material as defined by G. Chinga-Carrasco in *Nanoscale Research Letters,* 2011; 6:417: "MFC materials may be composed of (1) nanofibrils, (2) fibrillar fines, (3) fibre fragments and (4) fibres. This implies that MFC is not necessarily synonymous with microfibrils, nanofibrils or any other cellulose nano-structure. However, properly produced MFC materials contain nano-structures as a main component, i.e. nanofibrils." The diameters (or, for the microfibrillated cellulose fibers, the "lateral dimensions") of these components are reproduced in Table 1 of that same document and are as follows: (1) nanofibrils (<0.1 μm); (2) fibrillar fines (<1 μm); (3) fibres or fibre fragments (10 to 50 μm).

Furthermore, the term "microfibrillated cellulose," as used herein, does not include dry ground cellulose (also referred to as micronized cellulose or microfine cellulose) and does not include microcrystalline cellulose obtained by removing amorphous portions by acid hydrolysis, as described in U.S. Pat. No. 5,554,287.

In some embodiments, a majority (that is, greater than half) of the microfibrillated fibers have a lateral dimension (for example, a width in 2 dimensions) of up to 1 micron, up to 1.5 microns, up to 2 microns, up to 3 microns, or up to 4 microns. In some embodiments, a majority of the microfibrillated fibers have a lateral dimension of at least 0.5 micron, or at least 0.7 micron. In an exemplary embodiment, a majority of the microfibrillated fibers have a lateral dimension in a range of 0.5 micron to 4 microns. In another exemplary embodiment, a majority of the microfibrillated fibers have a lateral dimension in a range of 0.5 micron to 1.5 microns. In a further exemplary embodiment, a majority of the microfibrillated fibers have a lateral dimension of up to 2 microns.

In some embodiments, the microfibrillated fibers are incorporated within (that is, distributed throughout) the fibrous media, thereby forming a filter media (also referred to herein as a "filtration medium" or "filter medium").

Features of the Non-Woven Filtration Media

In some embodiments, the nonwoven filtration medium has a solidity of at least 2%, at least 3%, at least 4%, at least 5%, at least 6%, at least 7%, at least 8%, at least 9%, or at least 10%. In some embodiments, the nonwoven filtration medium has a solidity of up to 5%, up to 6%, up to 7%, up to 8%, up to 9%, up to 10%, up to 11%, up to 12%, up to 13%, up to 14%, up to 15%, up to 16%, up to 17%, up to 18%, up to 19%, or up to 20%. In an exemplary embodiment, the nonwoven filtration medium has a solidity in a range of 5% to 15%. In some embodiments, solidity is preferably measured as described in the Examples.

In some embodiments, the nonwoven filtration medium has a basis weight of at least 20 grams per square meter ($g/m^2$), at least 24 $g/m^2$, at least 25 $g/m^2$, at least 30 $g/m^2$, at least 35 $g/m^2$, at least 40 $g/m^2$, at least 50 $g/m^2$, at least 60 $g/m^2$, or at least 70 $g/m^2$. In some embodiments, the nonwoven filtration medium has a basis weight of up to 25 $g/m^2$, up to 30 $g/m^2$, up to 35 $g/m^2$, up to 40 $g/m^2$, up to 50 $g/m^2$, up to 60 $g/m^2$, up to 70 $g/m^2$, up to 75 $g/m^2$, up to 80 $g/m^2$, up to 85 $g/m^2$, up to 90 $g/m^2$, up to 95 $g/m^2$, up to 100 $g/m^2$, or up to 105 $g/m^2$. In an exemplary embodiment, the nonwoven filtration medium has a basis weight in a range of 24 $g/m^2$ to 100 $g/m^2$. In some embodiments, basis weight is preferably measured using ASTM D646-13.

In some embodiments, the nonwoven filtration medium has a pore size of at least 0.5 micron, at least 1 micron, at least 1.5 microns, at least 2 microns, at least 3 microns, at least 5 microns, or at least 10 microns. In some embodiments, the nonwoven filtration medium has a pore size of up to 5 microns, up to 10 microns, up to 15 microns, or up to 20 microns. In an exemplary embodiment, the nonwoven filtration medium has a pore size of 0.5 micron to 20 microns. In an exemplary embodiment, the nonwoven filtration medium has a pore size of 2 microns to 15 microns. Pore size, as used herein, refers to mean flow pore size, calculated as described in ASTM F316-03.

In some embodiments, the nonwoven filtration medium has a P95/P50 ratio of at least 1.5 or at least 2. In some embodiments, the nonwoven filtration medium has a P95/P50 ratio of up to 3.

In some embodiments, the nonwoven filtration medium has a thickness of at least 0.1 mm, at least 0.12 mm, at least 0.15 mm, or at least 0.2 mm. In some embodiments, the nonwoven filtration medium has a thickness of up to 0.2 mm, up to 0.4 mm, up to 0.5 mm, up to 0.7 mm, or up to 1 mm. In some embodiments, thickness of the filtration medium has is preferably measured according to the TAPPI T411 om-15 test method using a foot pressure of 1.5 psi.

In some embodiments, the nonwoven filtration medium has a permeability of at least 1 $ft^3/ft^2/min$ at 0.5 inches of water, at least 5 $ft^3/ft^2/min$ at 0.5 inches of water, or at least 10 $ft^3/ft^2/min$ at 0.5 inches of water. In some embodiments, the nonwoven filtration medium has a permeability of up to 10 $ft^3/ft^2/min$ at 0.5 inches of water, up to 20 $ft^3/ft^2/min$ at 0.5 inches of water, up to 50 $ft^3/ft^2/min$ at 0.5 inches of water, up to 75 $ft^3/ft^2/min$ at 0.5 inches of water, or up to 100 $ft^3/ft^2/min$ at 0.5 inches of water. In an exemplary embodiment, the nonwoven filtration medium has a permeability in a range of 1 $ft^3/ft^2/min$ at 0.5 inches of water to 100 $ft^3/ft^2/min$ at 0.5 inches of water. In another exemplary embodiment, the nonwoven filtration medium has a permeability in a range of 10 $ft^3/ft^2/min$ at 0.5 inches of water to 75 $ft^3/ft^2/min$ at 0.5 inches of water. In some embodiments, air permeability is preferably measured according to ASTM D737-18.

In some embodiments, the nonwoven filtration medium is substantially free of resin. In some embodiments, the nonwoven filtration medium does not include a resin. At the time of the invention, resin was often used to maintain spacing of the fibers in a filter media and to prevent instability of the media. However, resin blocks the pores in a filter medium, reducing filtration medium solidity and, therefore, life.

Without wishing to be bound by theory, it is believed that using microfibrillated fiber in combination with the large efficiency fibers (having a fiber diameter in a range of 1 micron to 5 microns) is particularly beneficial to allowing the filtration medium to be substantially free of resin. The microfibrillated fiber are believed to provide more tensile strength, helping to maintain spacing of the fibers. Moreover, the large efficiency fibers are believed to provide more uniform pore structures.

In some embodiments, a nonwoven filtration medium includes bicomponent fiber in a range of 25 wt-% to 85 wt-%. Using less than 25 wt-% bicomponent fiber is expected to result in a media with inadequate strength because the binder portion of the bicomponent fiber helps hold the media together during use. Using more than 85 wt-% bicomponent fiber would result in a media without enough of the other fibers to provide the desired efficiency and uniform structure.

In some embodiments, a nonwoven filtration medium includes a small efficiency fiber (having a fiber diameter of at least 0.1 micron and less than 1 micron) in an amount in a range of 5 wt-% to 50 wt-%. Using less than 5 wt-% of the small efficiency fibers often results in a media that did not provide the desired efficiency (for example a $\beta_{4\ \mu m}$ greater than 10). Using more than 50 wt-% of the small efficiency fibers would increase pressure drop and often results in a weaker media because the fibers were not in contact with another fiber that would help hold them in the media.

In some embodiments, a nonwoven filtration medium includes a large efficiency fiber (having a fiber diameter in a range of 1 micron to 5 microns) in an amount in a range of 10 wt-% to 50 wt-%. Using less than 10 wt-% of the large efficiency fibers often results in a media that has irregular pore sizes. Using more than 50 wt-% of the large efficiency fibers often results in a media that does not include enough small efficiency fibers to attain the desired efficiency or enough bicomponent fiber to provide the needed strength during use.

In some embodiments, a nonwoven filtration medium includes a microfibrillated fiber in an amount in a range of 5 wt-% to 25 wt-%. Using less than 5 wt-% of the microfibrillated fiber often results in a media with insufficient strength during use and low efficiency. Using more than 25 wt-% of the microfibrillated fiber often results in irregular pore sizes (as indicated by a high P95/P50 ratio).

In the past, low melt PET fibers were sometimes used as a substitute for resin. However, these fibers melt during manufacture of the nonwoven filtration medium and, like resin, block the pores in the filter medium, reducing solidity and, therefore, life.

Methods of Using the Filtration Medium

The filtration medium described herein may be used in any method contemplated by a skilled artisan. In some embodiments, the filtration medium described herein are particularly well suited for filtering a liquid stream.

Exemplary liquid streams may include, for example, fuel, hydraulic oil, process water, air, diesel engine fluid (DEF), diesel engine lube oil, blow-by gas, etc., and combinations thereof.

In some embodiments, a method of filtering a liquid stream may include passing a liquid stream comprising a contaminant through a nonwoven filtration medium, and removing the contaminant from the liquid stream.

Exemplary Filtration Medium Aspects

Aspect 1 is a nonwoven filtration medium comprising: 25 wt-% to 85 wt-% of a bicomponent fiber having a fiber diameter in a range of 5 microns to 25 microns and a fiber length of 0.1 cm to 15 cm; 5 wt-% to 50 wt % of a small efficiency fiber having a fiber diameter of at least 0.1 micron and less than 1 micron; 10 wt-% to 50 wt % of a large efficiency fiber having a fiber diameter in a range of 1 micron to 5 microns; and 5 wt-% to 25 wt % of a microfibrillated fiber, wherein a majority of the microfibrillated fibers have a lateral dimension of up to 4 microns; wherein the nonwoven filtration medium is substantially free of glass fiber.

Aspect 2 is the nonwoven filtration medium of Aspect 1 comprising: 25 wt-% to 75 wt-% of the bicomponent fiber; 10 wt-% to 50 wt % of the small efficiency fiber; 10 wt-% to 25 wt % of the large efficiency fiber; or 10 wt-% to 25 wt % of the microfibrillated fiber; or a combination thereof.

Aspect 3 is the nonwoven filtration medium of Aspect 1 or Aspect 2, wherein the wt % is based on the total weight of the bicomponent fiber, the small efficiency fiber, the large efficiency fiber, and the microfibrillated cellulose fiber.

Aspect 4 is the nonwoven filtration medium of any of Aspects 1 to 3, wherein the bicomponent fiber comprises a structural polymer portion and a thermoplastic binder polymer portion, wherein the structural polymer portion has a melting point higher than the melting points of the binder polymer portion.

Aspect 5 is the nonwoven filtration medium of Aspect 4, wherein the structural polymer portion of the bicomponent fiber has a melting point of at least 240° C. and the binder polymer portion of the bicomponent fiber has a melting point of up to 115° C.

Aspect 6 is the nonwoven filtration medium of Aspect 4, wherein the structural polymer portion of the bicomponent fiber has a melting point of at least 240° C. and the binder polymer portion of the bicomponent fiber has a melting point in a range of 100° C. to 190° C.

Aspect 7 is the nonwoven filtration medium of Aspect 6, wherein the binder polymer portion of the bicomponent fiber has a melting point in a range of 140° C. to 160° C.

Aspect 8 is the nonwoven filtration medium of any of Aspects 4 to 7, wherein the structural polymer portion is the core of the bicomponent fiber and the sheath is the thermoplastic binder polymer portion of the bicomponent fiber.

Aspect 9 is the nonwoven filtration medium of any of Aspects 4 to 8, wherein the structural polymer portion comprises polyethylene terephthalate (PET) and the thermoplastic binder polymer portion comprises coPET.

Aspect 10 is the nonwoven filtration medium of any of the previous Aspects, wherein the bicomponent fiber comprises a first bicomponent fiber and a second bicomponent fiber.

Aspect 11 is the nonwoven filtration medium of any of the previous Aspects, wherein small efficiency fiber has a fiber diameter of at least 0.4 micron and less than 1 micron.

Aspect 12 is the nonwoven filtration medium of any of the previous Aspects, wherein the small efficiency fiber has a fiber diameter in a range of 0.6 micron to 0.8 micron.

Aspect 13 is the nonwoven filtration medium of any of the previous Aspects, wherein the small efficiency fiber has a fiber diameter of 0.7 micron.

Aspect 14 is the nonwoven filtration medium of any of the previous Aspects, wherein the small efficiency fiber has a length in a range of 1 mm to 15 mm.

Aspect 15 is the nonwoven filtration medium of any of the previous Aspects, wherein the small efficiency fiber comprises polyethylene terephthalate (PET).

Aspect 16 is the nonwoven filtration medium of any of the previous Aspects, wherein the large efficiency fiber has a fiber diameter in a range of 2 microns to 4 microns.

Aspect 17 is the nonwoven filtration medium of any of the previous Aspects, wherein the large efficiency fiber comprises polyethylene terephthalate (PET).

Aspect 18 is the nonwoven filtration medium of any of the previous Aspects, wherein a majority of the microfibrillated fibers have a lateral dimension of up to 2 microns.

Aspect 19 is the nonwoven filtration medium of any of the previous Aspects, wherein a majority of the microfibrillated fibers have a lateral dimension in a range of 0.5 micron to 1.5 microns.

Aspect 20 is the nonwoven filtration medium of any of the previous Aspects, wherein the microfibrillated fibers comprise microfibrillated cellulose fibers.

Aspect 21 is the nonwoven filtration medium of any of the previous Aspects, wherein the nonwoven filtration medium has a solidity in a range of 5% to 15%.

Aspect 22 is the nonwoven filtration medium of any of the previous Aspects, wherein the nonwoven filtration medium has a basis weight in a range of 24 g/m² to 100 g/m².

Aspect 23 is the nonwoven filtration medium of any of the previous Aspects, wherein the nonwoven filtration medium has a pore size in a range of 0.5 micron to 20 microns.

Aspect 24 is the nonwoven filtration medium of any of the previous Aspects, wherein the nonwoven filtration medium has a P95/P50 ratio of at least 1.5 or at least 2.

Aspect 25 is the nonwoven filtration medium of any of the previous Aspects, wherein the nonwoven filtration medium has a P95/P50 ratio of up to 3.

Aspect 26 is the nonwoven filtration medium of any of the previous Aspects, wherein the nonwoven filtration medium has a thickness in a range of 0.12 mm to 1 mm.

Aspect 27 is the nonwoven filtration medium of any of the previous Aspects, wherein the nonwoven filtration medium has a permeability in a range of 1 ft³/ft²/min at 0.5 inches of water to 100 ft³/ft²/min at 0.5 inches of water.

Aspect 28 is the nonwoven filtration medium of any of the previous Aspects, wherein the nonwoven filtration medium is substantially free of resin.

Aspect 29 is the nonwoven filtration medium of any of the previous Aspects, wherein the nonwoven filtration medium is substantially free of glass fiber.

Aspect 30 is the nonwoven filtration medium of any of the previous Aspects, wherein the small efficiency fiber comprises polyethylene terephthalate (PET), and wherein the PET of the small efficiency fiber has a melting point of at least 250° C., at least 275° C., or at least 290° C.

Aspect 31 is the nonwoven filtration medium of any of the previous Aspects, wherein the large efficiency fiber comprises polyethylene terephthalate (PET), and wherein the PET of the large efficiency fiber has a melting point of at least 250° C., at least 275° C., or at least 290° C.

Aspect 32 is a method of filtering a liquid stream, the method comprising passing a liquid stream comprising a contaminant through a nonwoven filtration medium, the nonwoven filtration medium comprising the nonwoven filtration medium of any of the previous Aspects, and removing the contaminant from the liquid stream.

Aspect 33 is the method of Aspect 32, wherein the liquid stream comprises fuel, hydraulic oil, process water, air, diesel engine fluid (DEF), diesel engine lube oil, or blow-by gas, or a combination thereof.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials, and solvents used in the following examples were purchased from commercial suppliers (such as Sigma Aldrich, St. Louis, MO) and were used without further purification unless otherwise indicated.

Preparation of Media Handsheets

Handsheets were prepared by weighing out of the component fibers to target the basis weight required when formed in a 30 cm by 30 cm sheet. A FORMAX 12"×12" Stainless Steel Sheet Mold (Catalog No. G-100, Adirondack Machine Corporation, Hudson Falls, NY) was used as the handsheet former and was prepared by placing a uniform nonwoven scrim layer with pores smaller than 100 μm at the bottom of the former (no removable forming wires were used). The former was then filled with cold tap water to almost full, but to allow room for an additional 1.5 L of water to be added. 1 mL of Tide HE laundry soap (Procter & Gamble, Cincinnati, OH) was added to the water in the handsheet former. To prepare the fibers, 1 L of cold tap water was added to a Vitamix blender along with 200 mL of 5% acetic acid in water. The weighed-out fibers were added to the blender and mixed on medium-low speed for 180 seconds. The contents of the blender were then added to the handsheet former, and the contents of the handsheet former were mixed to ensure the fibers are evenly distributed. The water was drained out the bottom of the handsheet former, allowing the fibers form a sheet as they are collected on the nonwoven scrim. Water was removed from the sheet using vacuum suction on the wire side, and the handsheet (still on the scrim) was dried on a one-sided hot plate speed dryer (Model 135 Speed Dryer, Emerson Apparatus, Gorham, Me.) at 120° C. for 10 minutes. The sheet was removed (from the scrim) and allowed to cool to ambient conditions before using.

Media Characterization

Liquid Filtration Performance Testing (Multipass)

Clean Pressure Drop, Media Velocity, Capacity, and 4 μm Beta ($\beta_{4\ \mu m}$) were calculated as described below using a circular flat sheet.

For Examples 2 and 3

Media was tested as described in ISO 16889:2008 (Hydraulic fluid power—Filters—Multi-pass method for evaluating filtration performance of a filter element) except hydraulic fluid was laden with that ISO Fine Test Dust was used instead of ISO Medium Test Dust. The media area was 0.0507 m²; the test flow rate was 2 L/minute, and the test was performed to a terminal element differential pressure of 200 kPa.

For Example 4

Media was tested as described in ISO 16889:2008 (Hydraulic fluid power—Filters—Multi-pass method for evaluating filtration performance of a filter element). The media area was 0.0507 m²; the test flow rate was 16 L/minute, and the test was performed to a terminal element differential pressure of 320 kPa.

Figure of Merit

Figure of Merit (FOM) is a measure of the performance of a filter media and of the filter media's ability to provide a certain level of clarification of a stream with a minimum energy used.

FOM in kPa⁻¹ is calculated using the following formula:

$$FOM = -ln(1/\beta_{4\ \mu m})/(\Delta P/\text{media velocity})$$

$ln(1/\beta_{4\ \mu m})$ is the natural logarithm of 1 divided by $\beta_{4\ \mu m}$. $\beta_{4\ \mu m}$ (unitless), pressure drop (ΔP or dP) in kPa, and media velocity in (mm/sec) are determined as described in the Liquid Filtration Performance Testing section, above.

Basis Weight, Basis Volume, Thickness & Solidity

Solidity (c) of a nonwoven layer (including, for example, a non-fine fiber layer or a composite including fine fiber and non-fine fiber layers) is calculated using the following equation:

$$c = BW/\rho Z$$

where BW is the basis weight, $\rho$ is the density of the fiber, and Z is the thickness of the media.

Thickness was measured according to TAPPI T411 om-15, entitled "Thickness (caliper) of paper, paperboard, and combined board;" a foot pressure of 1.5 psi was used. Basis Weight was measured using TAPPI T410 om-08, with the mass of the dry media (fibers and scrim) being measured using a 30 cm×30 cm sample on scrim.

Basis Volume (BV=BW/Z), that is, it is calculated by dividing the basis weight by the thickness.

Permeability

A sample at least 38 cm² was cut from a media to be tested. The sample was mounted on a TEXTEST® FX 3310 (obtained from Textest AG, Schwerzenbach, Switzerland). Permeability through the media was measured using air, wherein cubic feet of air per square feet of media per minute (ft³ air/ft² media/min) or cubic meters of air per square meters of media per minute (m³ air/m² media/min) was measured at a pressure drop of 0.5 inches (125 Pa) of water.

Capillary Flow Porometry (Pore Size Measurement)

Pore size measurement was performed by capillary flow porometry method using a continuous pressure scan on a Porometer 3G (Quanachrome Instruments, Boynton Beach, CA).

This method used silicone oil, having a surface tension of 20.1 dynes/cm and a wetting contact angle of 0, and samples were tested in both wet and dry states (first dry, then wet). Samples 6 mm in diameter were subjected to a continuous pressure scan selected to measure the majority of the cumulative pore size distribution in a range of 2% to 98%.

The sample was tested from low pressure to high pressure, while wet and dry. The air flow and sample pressure from the saturated part of the test is commonly called the wet curve. 256 data points were collected across the range of the scan of the pressures for both the dry curve and the wet curve. Data points were collected across the scan at a rate of approximately 17 data points per minute. The test was performed at ambient conditions (for example, 20° C. to 25° C.). No empirical tortuosity factor and/or a shape factor was applied to adjust the pore size diameter definition.

The flow porometry test procedure collects a set of pressure (typically plotted on the x-axis) and air flow (typically plotted on the y-axis) data for the dry sample, and a set of pressure and air flow data for the saturated (wet) sample. These two sets of data are commonly called the dry curve and the wet curve. That is:

Dry Curve=$V_{dry}$=air flow through a dry sample as a function of pressure

Wet Curve=$V_{wet}$=air flow through a saturated sample as a function of pressure Based on capillary theory, the pressure across the sample ($\Delta P$) can be converted to pore diameter (d) using the Young-Laplace formula, $$d = \frac{4\gamma \cos\theta}{\Delta P} \times (\text{Emperical Factor})$$

Where,
$\gamma$=fluid surface tension
$\theta$=fluid contact angle
d=pore diameter
$\Delta P$=pressure across sample This conversion allows the dry and wet curves to be defined as a function of pore diameter. That is:

Dry Curve=$V'_{dry}$=air flow through a dry sample as a function of diameter

Wet Curve=$V'_{wet}$=air flow through a saturated sample as a function of diameter The cumulative flow pore size distribution (Q) is defined as the ratio of the wet curve over the dry curve as a function of pore diameter. Where, $$Q(d) = \frac{V'_{wet}}{V'_{dry}}$$

Cumulative distributions may be represented as an increasing cumulative distribution from 0 to 100%, or as a decreasing cumulative distribution from 100% to 0%. The pore sizes in this document are defined from the increasing cumulative flow pore size distribution. Where, Incr.Cumulative Flow Pore Distribution=$1-Q(d)$ To better identify points along this curve, this document defines various P(x %) values that are equal to the corresponding pore diameter (d)

$P(x\%)=d$, where $x\% = 1-Q(d)$

Examples include, but are not limited to, the following:
P5 is the pore diameter that has an increasing cumulative flow pore distribution of 5%.
P10 is the pore diameter that has an increasing cumulative flow pore distribution of 10%.
P50 is the pore diameter that has an increasing cumulative flow pore distribution of 50%.
P90 is the pore diameter that has an increasing cumulative flow pore distribution of 90%.
P95 is the pore diameter that has an increasing cumulative flow pore distribution of 95%.

Where the maximum pore size was reported, the maximum pore size was determined by detecting the bubble point using the Porometer 3G (Quanachrome Instruments, Boynton Beach, CA), using the Auto Bubble Point (BP Auto Tolerance) method. According to this method, the bubble point is found after fluid begins passing through the sample, and three consecutive measurement increased by at least 1%. The bubble point is the value at the start of this sequence of three points.

Example 1

A glass-free filter media including 40 wt-% 14 µm-diameter bicomponent fibers, 20 wt-% 0.7 µm-diameter PET fibers, 20 wt-% 2.5 µm-diameter PET fibers, and 20 wt-% 1 µm-diameter microfibrillated rayon fibers was simulated using Geodict (Math2Market). A pictorial representation of the resulting media is shown in FIG. 1.

Example 2

Figure 2:
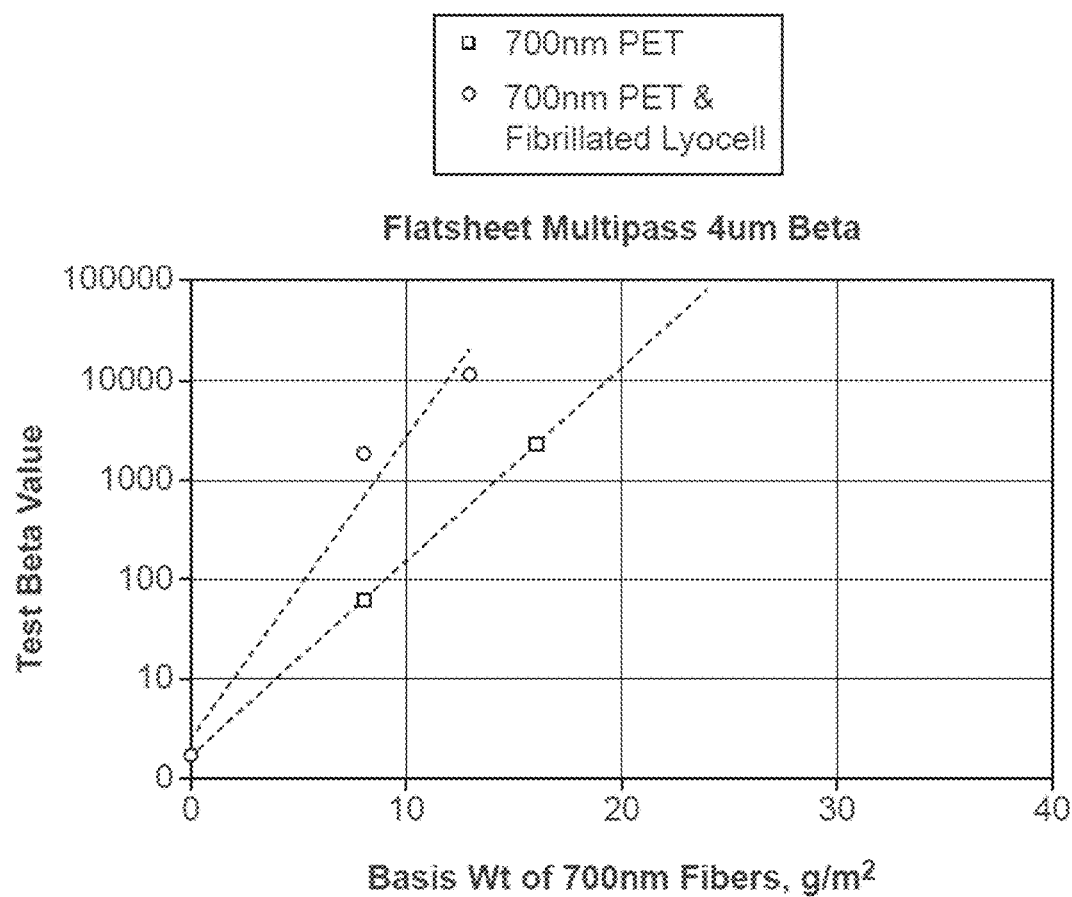
FIG. 2 shows test β values measured to determine $\beta_{4\ \mu m}$=10,000 for handsheets prepared as described in Example 2 and including 24 g/m² of 14 μm-diameter bicomponent fibers with varying amounts of 700 nm-diameter PET fibers (square data points) or 14 μm-diameter bicomponent fibers with varying amounts of 700 nm-diameter PET fibers, 1 μm-diameter microfibrillated rayon fibers (Lyocell), and 2.5 μm-diameter PET fibers (round data points). Trendlines for each data set were calculated using a curve fit in Excel.

Handsheets were prepared as described above by mixing 24 g/m² of 14 µm-diameter bicomponent fibers (Advansa 271P) with varying amounts of 700 nm-diameter PET fibers (TJ04BN, Teijin Fibers Limited, Osaka, Japan) (FIG. 2, square data points) or by mixing 24 g/m² of 14 μm-diameter bicomponent fibers with varying amounts of 700 nm-diameter PET fibers, 1 μm-diameter microfibrillated rayon fibers (Lyocell), and 2.5 μm-diameter PET fibers (Teijin Fibers Limited, Osaka, Japan) (FIG. 2, round data points), and β was measured to determine $\beta_{4\,\mu m}$=10,000. Results are shown in FIG. 2. Varying amounts of 700 nm-diameter PET fibers alone were used to provide varying basis weights. The amount of each fiber added is shown in Table 1.

TABLE 1

|  | Basis Weight of 14 μm-diameter bicomponent fibers | Basis Weight of 700 nm-diameter PET fibers | Basis Weight of 1 μm-diameter microfibrillated rayon fibers | Basis Weight of 2.5 pm-diameter PET fibers |
|---|---|---|---|---|
| Sample 1 | 24 g/m² | 0 | 0 | 24 g/m² |
| Sample 2 | 24 g/m² | 8 g/m² | 0 | 24 g/m² |
| Sample 3 | 24 g/m² | 16 g/m² | 0 | 24 g/m² |
| Sample 4 | 24 g/m² | 8 g/m² | 8 g/m² | 24 g/m² |
| Sample 5 | 24 g/m² | 13 g/m² | 13 g/m² | 24 g/m² |

Extrapolating from the data collected, it is expected that to achieve a $\beta_{4\,\mu m}$=10,000 from a media including 24 g/m² 14 μm-diameter bicomponent fibers would require about 20 g/m² of the 700 nm-diameter PET fibers. When adding 1 μm-diameter microfibrillated rayon fibers and 2.5 μm-diameter PET fibers to the 700 nm-diameter PET fibers and the 14 μm-diameter bicomponent fibers, however, it would only take about 12 g/m² of the 700 nm-diameter PET fiber to achieve a $\beta_{4\,\mu m}$=10,000.

These results were unexpected because typically to make a high efficiency media for liquid filtration, smaller fibers are added. As shown in this Example, however, the same efficiency achieved by adding 700 nm-diameter PET fibers to 14 μm-diameter bicomponent fibers was achieved by removing some of these smaller fibers and replacing them with larger (1 μm (1000 nm)-diameter microfibrillated rayon fibers and 2.5 μm (2500 nm)-diameter PET fibers.

Without wishing to be bound by theory, it is believed that using 1 μm-diameter microfibrillated rayon fibers in combination with 2.5 μm-diameter PET fibers is particularly beneficial. The 1 μm-diameter microfibrillated rayon fibers are believed to provide more tensile strength than if the 2.5 μm-diameter PET fibers were used without the microfibrillated rayon fibers. The 2.5 μm-diameter PET fibers are believed to provide more uniform pore structures than if the microfibrillated rayon fibers were used without the 2.5 μm-diameter PET fibers.

Example 3

Figure 3:
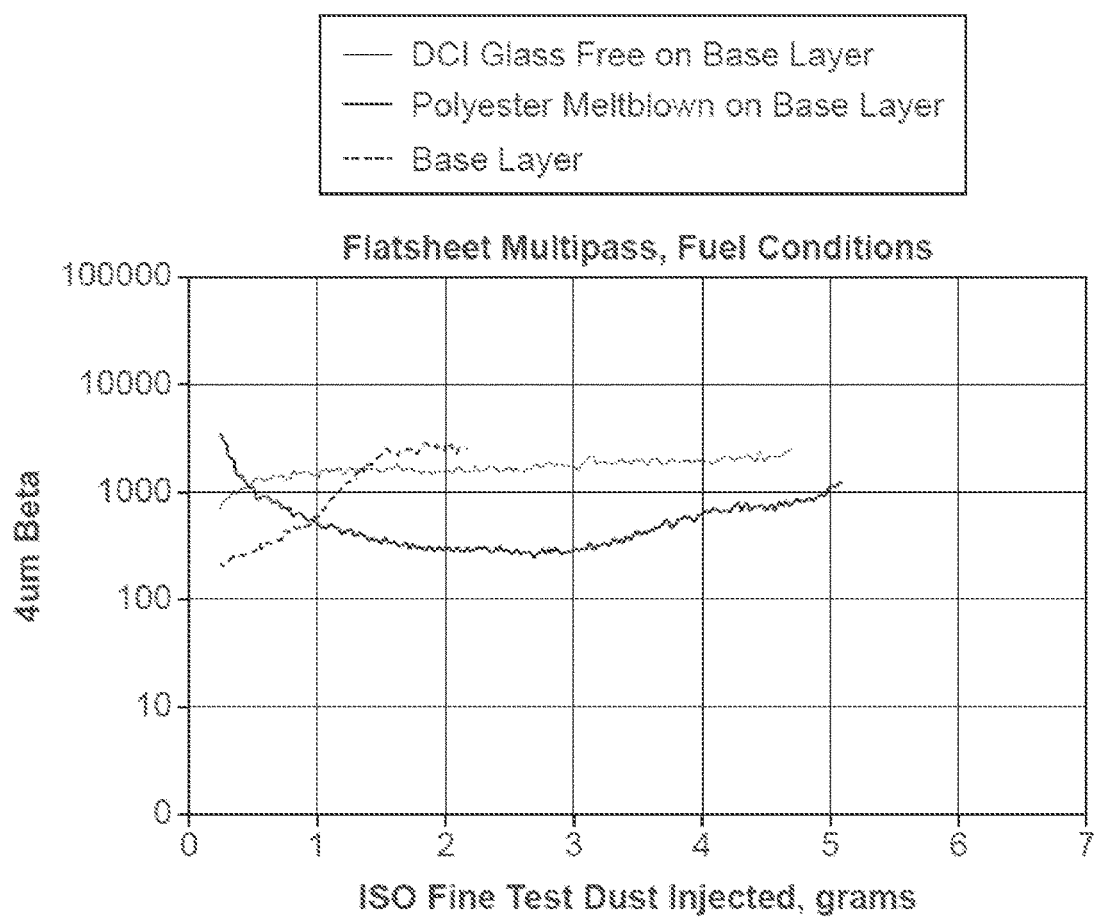
FIG. 3 shows $\beta_{4\ \mu m}$ measured for media prepared as described in Example 3.

$\beta_{4\,\mu m}$ was measured using ISO Fine test dust at a concentration of 40 mg/L for Captimax 190 SC (Ahlstrom) (FIG. 3, "Base Layer"), and for a combination of polyester meltblown (FF40/240 PBT, Ahlstrom) and Captimax 190 SC (Ahlstrom) (FIG. 3, "Polyester Meltblown on Base Layer").

Handsheets were prepared in a wet laid process by mixing 50 wt-% 14 μm-diameter bicomponent fibers with 1 μm-diameter microfibrillated rayon fibers (Lyocell) and 2.7 μm-diameter PET fibers (TJ04BN, Teijin) (FIG. 3, "DCI Glass Free on Base Layer"); $\beta_{4\,\mu m}$ was measured using ISO Fine test dust at a concentration of 40 mg/L. Results are shown in FIG. 3.

When the $\beta_{4\,\mu m}$ was measured for the Captimax media, variable efficiency was observed. Without wishing to be bound by theory, this likely due to a lack of uniform pore sizes. The presence of larger pores results in a decrease in the efficiency observed when larger particles are added until those large particles fill the larger pores at which time efficiency increases again.

Example 4

Handsheets were prepared as described above by mixing co-PET/PET bicomponent fibers (TJ04CN, Teijin Ltd., Tokyo, Japan), 2.7 μm-diameter PET fibers (Teijin Ltd., Tokyo, Japan), microfibrillated cellulose fibers (L-10-4, Engineered Fibers Technology. LLC, Shelton, CT), and 700 nm-diameter PET fibers (Teijin Ltd., Tokyo, Japan) in the proportions indicated in Table 2A.

The physical properties of the resulting media (mass, thickness, permeability, basis weight, basis volume, and solidity) were tested as described above and results are shown in Table 2B.

The pore sizes of the resulting media were tested as described above and results are shown in Table 2C. Clean Pressure Drop, Media Velocity, Capacity, and 4 μm Beta ($\beta_{4\,\mu m}$) were calculated as described above and results are shown in Table 2C.

The efficiency ($\beta_{4\,\mu m}$) was compared with the combined fiber mass percentage (wt-%) of the microfibrillated rayon and the 700 nm-diameter PET fibers in each handsheet (FIG. 5). These results indicate that increasing the combined fiber mass percentage of these two fibers increases the efficiency of the resulting filter media.

Figure 5B:
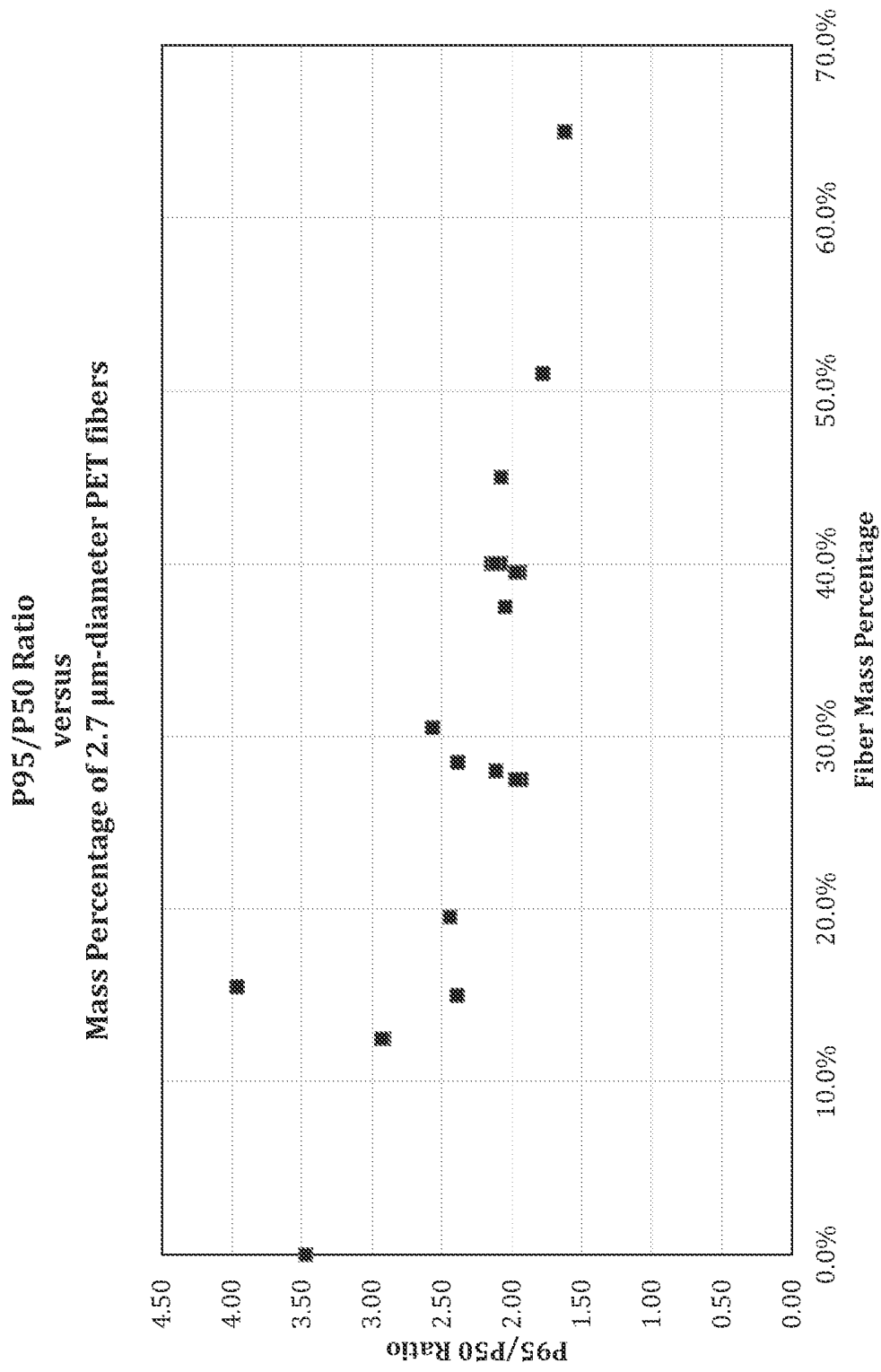
FIG. 5B shows the P95/P50 plotted against the fiber mass percentage of 2.7 μm-diameter PET fibers in media with differing amounts of 2.7 μm-diameter PET fibers, as further described in Example 4.

The P95/P50 ratio of the resulting media was compared with the fiber mass percentage (wt-%) of the microfibrillated rayon in each handsheet (FIG. 5A) or the fiber mass percentage (wt-%) of the 2.7 μm-diameter PET fibers in each handsheet (FIG. 5B). These results indicate that adding more of the microfibrillated rayon fibers results in less uniform pore sizes (as indicated by an increasing P95/P50 ratio with increasing fiber mass percentage in FIG. 5A) whereas adding more of the 2.7 μm-diameter PET fibers results in more uniform pore sizes (as indicated by a decreasing P95/P50 ratio with increasing fiber mass percentage in FIG. 5B).

Figure 6B:
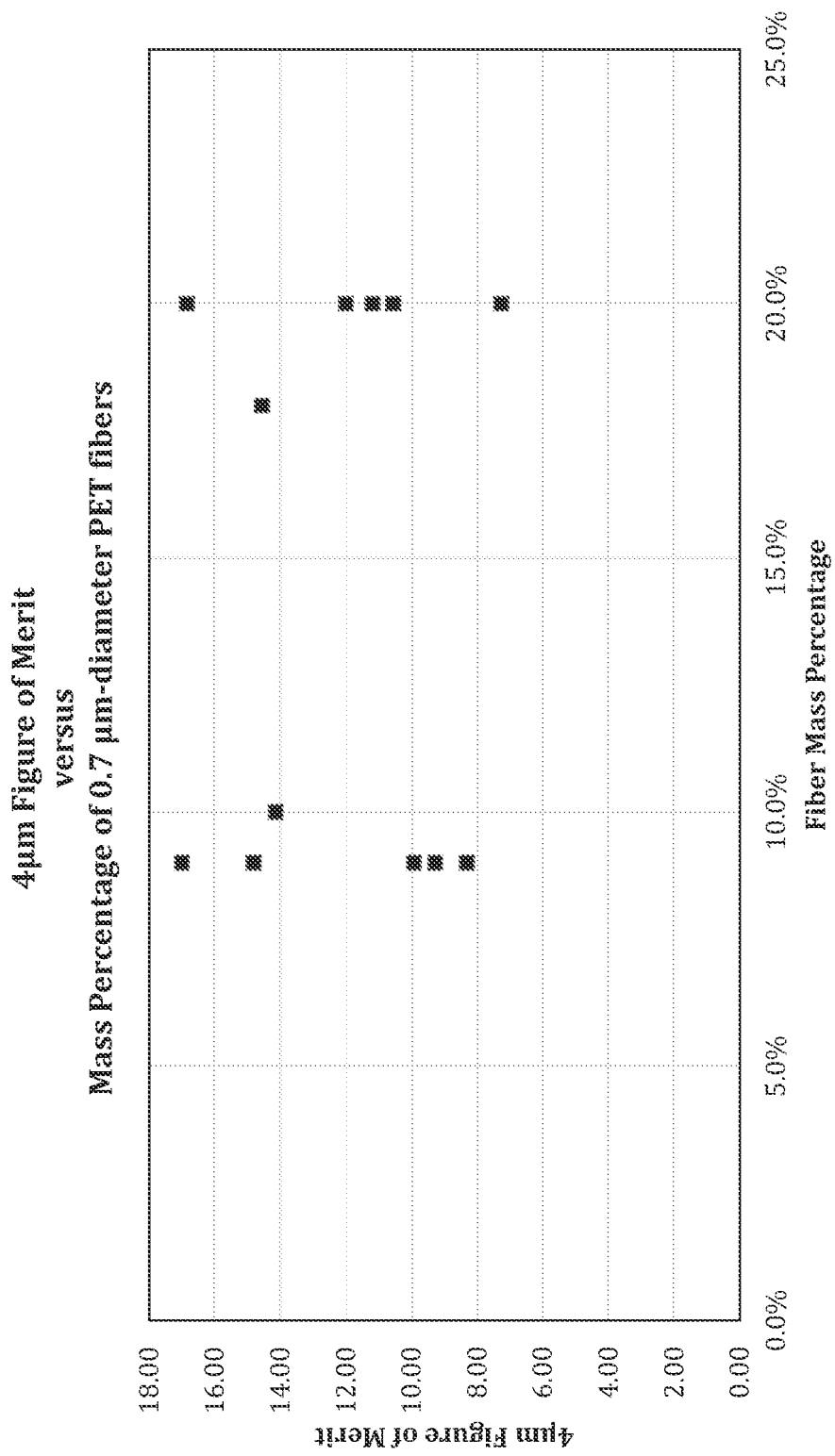
FIG. 6B shows FOM plotted against the fiber mass percentage of 0.7 μm-diameter PET fibers in media with differing amounts of 0.7 μm-diameter PET fibers, as further described in Example 4.

The Figure of Merit (FOM) of the resulting media was compared with the fiber mass percentage (wt-%) of the microfibrillated rayon in each handsheet (FIG. 6A) or the fiber mass percentage (wt-%) of the 2.7 μm-diameter PET fibers in each handsheet (FIG. 6B). While increasing the fiber mass percentage of the 2.7 μm-diameter PET fibers does not improve FOM (FIG. 6B) because improving efficiency results in higher pressure drop, increasing the fiber mass percentage of the microfibrillated rayon increased FOM (FIG. 6A), indicating that efficiency is improved without a corresponding increase in pressure drop.

TABLE 2A

| | Fiber Amounts | | | | |
|---|---|---|---|---|---|
| Design | coPET/PET Bi-Component Fiber Teijin TJ04CN 2.2dtex × 5 mm (wt-%) | 2.7 µm PET Teijin TP04 0.06dtex × 3 mm (wt-%) | Microfibrillated Cellulose EFT L-010-4[1] (wt-%) | 700 nm PET Teijin NANOFRONT (wt-%) | Combined Fibrillated Cellulose + 700 nm PET (wt-%) |
| 1 | 35.0 | 65.0 | 0.0 | 0.0 | 0.0 |
| 2 | 59.5 | 15.5 | 25.0 | 0.0 | 25.0 |
| 3 | 51.5 | 39.5 | 0.0 | 9.0 | 9.0 |
| 4 | 52.5 | 12.5 | 15.0 | 20.0 | 35.0 |
| 5 | 37.0 | 40.0 | 14.0 | 9.0 | 23.0 |
| 6 | 52.5 | 12.5 | 15.0 | 20.0 | 35.0 |
| 7 | 51.5 | 39.5 | 0.0 | 9.0 | 9.0 |
| 8 | 44.5 | 30.5 | 25.0 | 0.0 | 25.0 |
| 9 | 35.5 | 19.5 | 25.0 | 20.0 | 45.0 |
| 10 | 63.5 | 27.5 | 9.0 | 0.0 | 9.0 |
| 11 | 37.0 | 40.0 | 14.0 | 9.0 | 23.0 |
| 12 | 37.0 | 40.0 | 14.0 | 9.0 | 23.0 |
| 13 | 65.0 | 15.0 | 0.0 | 20.0 | 20.0 |
| 14 | 65.0 | 0.0 | 25.0 | 10.0 | 35.0 |
| 15 | 63.5 | 27.5 | 9.0 | 0.0 | 9.0 |
| 16 | 42.5 | 28.5 | 9.0 | 20.0 | 29.0 |
| 17 | 54.0 | 28.0 | 0.0 | 18.0 | 18.0 |
| 18 | 42.5 | 51.0 | 6.5 | 0.0 | 6.5 |
| 19 | 35.0 | 45.0 | 0.0 | 20.0 | 20.0 |
| 20 | 50.0 | 37.5 | 12.5 | 0.0 | 12.5 |

[1] L-10-4 is Lyocell Fiber, 10 mL CSF, 4 mm Starting Length, available from Engineered Fibers Technology. LLC (Shelton, CT)

TABLE 2B

| | Media Physical Properties | | | | | |
|---|---|---|---|---|---|---|
| Design | Mass of 30 cm × 30 cm on scrim grams | Thickness mm | Air Permeability at 125 Pa ft/min | Basis Weight g/m² | Basis Volume g/cm³ | Solidity % |
| 1 | 5.25 | 0.393 | 50.1 | 34.2 | 0.087 | 6.3% |
| 2 | 4.93 | 0.314 | 24.4 | 30.7 | 0.098 | 6.9% |
| 3 | 5.25 | 0.363 | 29.2 | 34.2 | 0.094 | 6.8% |
| 4 | 4.98 | 0.346 | 8.74 | 31.2 | 0.090 | 6.5% |
| 5 | 4.98 | 0.336 | 15.9 | 31.2 | 0.093 | 6.7% |
| 6 | 5.02 | 0.334 | 9.16 | 31.7 | 0.095 | 6.8% |
| 7 | 5.07 | 0.364 | 30.7 | 32.2 | 0.089 | 6.4% |
| 8 | 5.06 | 0.317 | 18.5 | 32.1 | 0.101 | 7.2% |
| 9 | 4.99 | 0.335 | 5.86 | 31.3 | 0.094 | 6.6% |
| 10 | 5.06 | 0.318 | 58.4 | 32.1 | 0.101 | 7.3% |
| 11 | 4.89 | 0.341 | 14.4 | 30.2 | 0.089 | 6.3% |
| 12 | 4.86 | 0.32 | 14.9 | 29.9 | 0.093 | 6.7% |
| 13 | 4.94 | 0.387 | 13.7 | 30.8 | 0.080 | 5.8% |
| 14 | 5.1 | 0.299 | 9.08 | 32.6 | 0.109 | 7.7% |
| 15 | 4.82 | 0.318 | 57.6 | 29.4 | 0.093 | 6.7% |
| 16 | 4.99 | 0.318 | 10.2 | 31.3 | 0.099 | 7.1% |
| 17 | 4.92 | 0.342 | 15.9 | 30.6 | 0.089 | 6.5% |
| 18 | 4.99 | 0.346 | 44.5 | 31.3 | 0.091 | 6.5% |
| 19 | 5.06 | 0.341 | 15.2 | 32.1 | 0.094 | 6.8% |
| 20 | 5.01 | 0.344 | 39.7 | 31.6 | 0.092 | 6.6% |

TABLE 2C

| | Pore Size | | | | Multipass | | | |
|---|---|---|---|---|---|---|---|---|
| Design | P50 µm | P90 µm | P95 µm | P95/P50 ~ | Clean Pressure Drop/Media Velocity kPa/(mm/sec) | Capacity grams | 4 µm Beta ~ | 4 µm FoM (mm/sec)/kPa |
| 1 | 12.256 | 18.749 | 19.882 | 1.62 | 0.10 | 3.57 | 1.43 | 3.76 |
| 2 | 5.549 | 17.139 | 21.984 | 3.96 | 0.16 | 2.52 | 22.17 | 18.92 |
| 3 | 7.144 | 12.472 | 13.911 | 1.95 | 0.14 | 2.75 | 5.80 | 12.78 |
| 4 | 2.451 | 5.764 | 7.145 | 2.92 | 0.49 | 2.50 | 715.36 | 13.35 |

TABLE 2C-continued

| | Pore Size | | | | Multipass | | | |
|---|---|---|---|---|---|---|---|---|
| | P50 | P90 | P95 | P95/P50 | Clean Pressure Drop/Media Velocity | Capacity | 4 μm Beta | 4 μm FoM |
| Design | μm | μm | μm | ~ | kPa/(mm/sec) | grams | ~ | (mm/sec)/kPa |
| 5 | 4.912 | 9.144 | 10.533 | 2.14 | 0.23 | 2.78 | 65.67 | 18.30 |
| 6 | 2.497 | 5.847 | 7.309 | 2.93 | 0.51 | 2.36 | 452.70 | 12.00 |
| 7 | 7.552 | 13.268 | 14.904 | 1.97 | 0.13 | 2.73 | 5.09 | 12.36 |
| 8 | 5.286 | 11.410 | 13.566 | 2.57 | 0.22 | 2.65 | 39.08 | 17.00 |
| 9 | 2.163 | 4.465 | 5.283 | 2.44 | | | | |
| 10 | 11.951 | 21.025 | 23.096 | 1.93 | 0.09 | 5.10 | 2.15 | 8.32 |
| 11 | 4.810 | 8.755 | 10.007 | 2.08 | 0.25 | 4.93 | 68.41 | 16.84 |
| 12 | 4.953 | 9.132 | 10.509 | 2.12 | 0.26 | 4.01 | 43.90 | 14.81 |
| 13 | 3.916 | 7.780 | 9.361 | 2.39 | 0.35 | 2.38 | 64.54 | 12.01 |
| 14 | 2.465 | 6.580 | 8.557 | 3.47 | 0.68 | 2.18 | 851.17 | 9.93 |
| 15 | 11.785 | 21.108 | 23.226 | 1.97 | 0.10 | 2.78 | 2.44 | 9.28 |
| 16 | 3.318 | 6.726 | 7.915 | 2.39 | 0.50 | 2.41 | 186.59 | 10.56 |
| 17 | 4.657 | 8.526 | 9.844 | 2.11 | 0.25 | 2.46 | 36.42 | 14.14 |
| 18 | 10.714 | 17.356 | 19.058 | 1.78 | 0.11 | 3.02 | 2.17 | 7.27 |
| 19 | 4.916 | 8.990 | 10.203 | 2.08 | 0.28 | 3.01 | 63.32 | 14.56 |
| 20 | 8.842 | 16.116 | 18.096 | 2.05 | 0.12 | 2.84 | 3.71 | 11.18 |

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A nonwoven filtration medium comprising:
   25 wt-% to 75 wt-% of a bicomponent fiber having a fiber diameter in a range of 5 microns to 25 microns and a fiber length of 0.1 cm to 15 cm;
   10 wt-% to 25 wt-% of a small efficiency fiber comprising a meltable polymer and having a fiber diameter of at least 0.6 micron and less than 1 micron;
   10 wt-% to 50 wt-% of large efficiency fiber having a fiber diameter in a range of 1 micron to 4 microns; and
   10 wt-% to 25 wt-% of a microfibrillated cellulosic fiber, having a different chemical composition than the small efficiency fiber, wherein a majority of the microfibrillated cellulosic fibers have a lateral dimension of 0.5 micron to 2 microns;
   wherein the nonwoven filtration medium is substantially free of glass fiber.

2. The nonwoven filtration medium of claim 1, wherein the bicomponent fiber comprises a structural polymer portion and a thermoplastic binder polymer portion, wherein the structural polymer portion has a melting point higher than the melting point of the binder polymer portion.

3. The nonwoven filtration medium of claim 2, wherein the structural polymer portion of the bicomponent fiber has a melting point of at least 240° C. and the binder polymer portion of the bicomponent fiber has a melting point in a range of 100° C. to 190° C.

4. The nonwoven filtration medium of claim 1, wherein the small efficiency fiber has a fiber diameter of at least 0.6 micron to less than 0.8 micron.

5. The nonwoven filtration medium of claim 1, wherein the large efficiency fiber has a fiber diameter in a range of 2 microns to 4 microns.

6. The nonwoven filtration medium of claim 1, wherein the small efficiency fiber comprises PET; or wherein the large efficiency fiber comprises PET; or both.

7. The nonwoven filtration medium of claim 1, wherein the microfibrillated cellulosic fibers comprise rayon.

8. The nonwoven filtration medium of claim 1, wherein the nonwoven filtration medium has a solidity in a range of 5% to 15%.

9. The nonwoven filtration medium of claim 1, wherein the nonwoven filtration medium has a basis weight in a range of 24 g/m$^2$ to 100 g/m$^2$.

10. The nonwoven filtration medium of claim 1, wherein the nonwoven filtration medium has a pore size in a range of 0.5 micron to 20 microns.

11. The nonwoven filtration medium of claim 1, wherein the nonwoven filtration medium has a P95/P50 ratio in a range of 1.5 to 3.

12. The nonwoven filtration medium of claim 1, wherein the nonwoven filtration medium has a thickness in a range of 0.12 mm to 1 mm.

13. The nonwoven filtration medium of claim 1, wherein the nonwoven filtration medium has a permeability in a range of 1 ft$^3$/ft$^2$/min at 0.5 inches of water to 100 ft$^3$/ft$^2$/min at 0.5 inches of water.

14. The nonwoven filtration medium of claim 1, wherein the nonwoven filtration medium is substantially free of resin.

15. The nonwoven filtration medium of claim 1, wherein the nonwoven filtration medium is free of glass fiber.

16. A method of filtering a liquid stream, the method comprising:
   passing a liquid stream comprising a contaminant through a nonwoven filtration medium, the nonwoven filtration medium comprising:
   25 wt-% to 75 wt-% of a bicomponent fiber having a fiber diameter in a range of 5 microns to 25 microns and a fiber length of 0.1 cm to 15 cm;
   10 wt-% to 25 wt-% of a small efficiency fiber comprising a meltable polymer and having a fiber diameter of at least 0.60 micron and less than 1 micron;

10 wt-% to 50 wt-% of large efficiency fiber having a fiber diameter in a range of 1 micron to 4 microns; and 10 wt-% to 25 wt-% of a microfibrillated cellulosic fiber, having a different chemical composition than the small efficiency fiber, wherein a majority of the microfibrillated cellulosic fibers have a lateral dimension of 0.5 micron to 2 microns;

wherein the nonwoven filtration medium is substantially free of glass fiber, and removing the contaminant from the liquid stream.

17. The method of claim 16, wherein the liquid stream comprises fuel, hydraulic oil, process water, air, diesel engine fluid (DEF), diesel engine lube oil, or a combination thereof.

18. A nonwoven filtration medium comprising:

25 wt-% to 50 wt-% of a bicomponent fiber having a fiber diameter in a range of 10 microns to 20 microns and a fiber length of 0.1 cm to 15 cm, the bicomponent fiber comprising PET and a binder polymer selected from a group consisting of copolymer PET, polyethylene, PET, nylon, polypropylene, polytetrafluoroethylene, polyethersulfone, polyphenylene sulfide, a meta-aramid, a para-aramid, poly lactic acid, ethylene vinyl alcohol, polyvinyl chloride, polyvinylidene fluoride, or a combination thereof;

10 wt-% to 25 wt-% of a small efficiency fiber having a fiber diameter of at least 0.6 micron and less than 0.8 micron, the small efficiency fiber comprising a meltable polymer selected from a group consisting of nylon, an acrylic, rayon, polypropylene, polyethylene, ethylene vinyl alcohol, poly lactic acid, polyvinyl alcohol, polyvinyl chloride, polytetrafluoroethylene, or a combination thereof;

10 wt-% to 50 wt-% of large efficiency fiber having a fiber diameter in a range of 1 micron to 4 microns, the large efficiency fiber comprising a meltable polymer selected from a group consisting of nylon, an acrylic, rayon, polypropylene, polyethylene, ethylene vinyl alcohol, poly lactic acid, polyvinyl alcohol, polyvinyl chloride, polytetrafluoroethylene, or a combination thereof; and 10 wt-% to 25 wt-% of a microfibrillated cellulosic fiber, wherein a majority of the microfibrillated cellulosic fibers have a lateral dimension in a range of 0.5 micron to 1.5 micron;

wherein the nonwoven filtration medium is substantially free of glass fiber.

* * * * *